(12) United States Patent
Katayama

(10) Patent No.: US 6,594,206 B2
(45) Date of Patent: Jul. 15, 2003

(54) OPTICAL HEAD AND OPTICAL INFORMATION RECORDING/ REPRODUCING DEVICE

(75) Inventor: Ryuichi Katayama, Tokyo (JP)

(73) Assignee: NEC Corporation, Tokyo (JP)

( * ) Notice: Subject to any disclaimer, the term of this patent is extended or adjusted under 35 U.S.C. 154(b) by 284 days.

(21) Appl. No.: 09/736,285

(22) Filed: Dec. 15, 2000

(65) Prior Publication Data

US 2002/0126588 A1 Sep. 12, 2002

(30) Foreign Application Priority Data

Dec. 15, 1999 (JP) .......................................... 11-355385

(51) Int. Cl.7 ................................................. G11B 7/00
(52) U.S. Cl. ................................................... 369/44.32
(58) Field of Search ........................... 369/44.32, 53.19, 369/44.26, 44.41, 44.23, 112.02, 112.05, 112.1

(56) References Cited

U.S. PATENT DOCUMENTS

| | | | | |
|---|---|---|---|---|
| 5,138,592 A | * | 8/1992 | Fujita ...................... | 369/44.13 |
| 5,301,175 A | | 4/1994 | Nakamura | |
| 5,412,630 A | * | 5/1995 | Deguchi et al. ......... | 369/44.32 |
| 5,523,989 A | | 6/1996 | Ishibashi | |
| 5,751,680 A | | 5/1998 | Ishibashi et al. | |
| 5,828,637 A | * | 10/1998 | Kim ....................... | 369/44.28 |
| 5,859,818 A | | 1/1999 | Tateishi et al. | |
| 6,246,648 B1 | * | 6/2001 | Kuribayashi ............. | 369/44.32 |
| 6,493,296 B1 | * | 12/2002 | Fukumoto et al. ....... | 369/44.32 |
| 6,507,544 B1 | * | 1/2003 | Ma et al. ................. | 369/44.41 |

FOREIGN PATENT DOCUMENTS

| | | |
|---|---|---|
| EP | 0 357 323 A2 | 3/1990 |
| JP | A 4-76828 | 3/1992 |
| JP | A 2000- 149298 | 5/2000 |

* cited by examiner

Primary Examiner—Thang V. Tran
(74) Attorney, Agent, or Firm—Young & Thompson

(57) ABSTRACT

The present invention provides an optical information recording/reproducing device which comprises a light source for emitting a light, a light transmitting system including an objective lens for focusing the emitted light onto an optical storage medium and a photo-detector system for detecting a reflected light from the optical storage medium, wherein before the light is incident into the objective lens, the light has been divided into a main beam and at least a sub-beam which are different in intensity distribution from each other, and the photo-detector system detects first and second track error signals from the main beam and the sub-beam separately, and said photo-detector system further obtains a difference in phase between the first and second track error signals in order to detect a radial tilt of the optical storage medium on the basis of the difference in phase, and further a compensation of the radial tilt is made on the basis of the detected radial tilt.

30 Claims, 29 Drawing Sheets

123

Intensity distribution of focused main beam spot

—— Tilt 0 degree

---- Tilt +0.5 degrees

Intensity distribution of focused sub-beam spot

— Tilt 0 degree
---- Tilt +0.5 degrees

Intensity distribution of focused main beam spot

—— Tilt 0 degree

---- Tilt −0.5 degrees

Intensity distribution of focused sub-beam spot

——— Tilt 0 degree

---- Tilt −0.5 degrees

Track error signal of main beam

—— Tilt 0 degree

---- Tilt +0.5 degrees

Track error signal of main beam

—— Tilt 0 degree

---- Tilt −0.5 degrees

Track error signal of main beam

— Tilt 0 degree

---- Tilt −0.5 degrees

Track error signal of main beam

——— land

- - - - groove radial tile signal

Radial tilt [degree]

OPTICAL HEAD AND OPTICAL INFORMATION RECORDING/REPRODUCING DEVICE

BACKGROUND OF THE INVENTION

The present invention relates to an optical head and an optical information recording/reproducing device, and more particularly to an optical head and an optical information recording/reproducing device which store informations to an optical storage medium and reproduce the informations stored in the optical storage medium, and also which are capable of detecting a radial tilt of the optical storage medium.

A recording density of the optical information recording/reproducing device is inversely proportional to the square of a diameter of a beam spot on the optical storage medium. As the diameter of the beam spot is small, then the recording density is high. The diameter of the beam spot is inversely proportional to the numerical aperture of an objective lens of the optical head. Namely, as the numerical aperture of the objective lens is high, the diameter of the beam spot is small and the recording density is high.

As the optical storage medium is tilted in a radial direction with reference to the objective lens, a distortion in shape or a deformation in shape of the beam spot is caused due to a frame aberration, whereby characteristics of the recording and reproducing operations are made deteriorated. Since the frame aberration is proportional to the third power of the numerical aperture of the objective lens, the increase in the numerical aperture of the objective lens makes narrow the acceptable margin in the radial tilt of the optical storage medium to keep the recording and reproducing characteristics. If the numerical aperture of the objective lens is increased in order to increase the recording density, then it is necessary to detect and correct the radial tilt of the optical recording medium to keep the recording and reproducing characteristics.

FIG. 1 is a schematic view illustrative of a first conventional optical head which is capable of detecting the radial tilt of the optical recording medium. This first conventional optical head is disclosed in Japanese laid-open patent publication No. 9-161293. The first conventional optical head has a semiconductor laser 121, a collimator lens 122, a diffraction optical device 123, a half mirror 124, an objective lens 125, an optical disk 126, a cylindrical lens 127, an additional lens 128 and a photo-detector 129. A laser beam is emitted from the semiconductor laser 121, and transmitted through the collimator lens 122 where the laser beam is collimated. The collimated laser beam is then transmitted through the diffraction optical device 123, where the collimated laser beam is divided into three parts, for example, 0-order light, +1-order diffracted light, and −1-order diffracted light. The divided three lights reach the half mirror 124, wherein about 50% of the divided three lights pass through the half mirror 124 and then are transmitted through the objective lens 125, wherein the lights are condensed onto the optical disk 126. The lights are then reflected from the optical disk 126 and further transmitted through the objective lens 125 to reach the half mirror 124, wherein about 50% of the reflected three lights are reflected by the half mirror 124. The further reflected three lights are then transmitted through the cylinder lens 127 and the additional lens 128 to reach the photo-detector 129. The photo-detector 129 is positioned at an intermediate point between focal points of the cylinder lens 127 and the additional lens 128.

FIG. 2 is a plane view illustrative of the diffraction optical device of the first conventional optical head shown in FIG. 1. The diffraction optical device 123 to provide both the +1-order diffracted light and the −1-order diffracted light with the frame aberration in the radial direction of the disk 126. A lattice direction of the diffraction optical device 123 is almost parallel to the radial direction of the disk 126. A lattice pattern of the diffraction optical device 123 is such that a left half region has a downwardly-arched pattern and a right half region has a upwardly-arched pattern, wherein the left and right regions are bounded by a center line crossing an optical axis of the diffraction optical device 123 and in a tangential direction perpendicular to the radial direction.

FIG. 3 is a plane view illustrative of an arrangement of beam spots of an alignment of tracks of the optical disk of the first conventional optical head shown in FIG. 1. Each of the tracks has a single alignment of pits. First, second and third beam spots 131, 132, and 133 correspond to the 0-order diffracted light, the +1-order diffracted light and the −1-order diffracted light, respectively. The first, second and third beam spots 131, 132, and 133 are aligned on a single track 130. The second beam spot 132 has a right side lobe in a right side with reference to the radial direction. The third beam spot 133 has a left side lobe in a left side with reference to the radial direction.

FIG. 4 is a plane view illustrative of an arrangement of the beam spots and an alignment of patterns of photo-receiving parts of the photo-detector in the first optical head shown in FIG. 1. First, second and third beam spots 140, 141 and 142 correspond to the 0-order diffracted light, the +1-order diffracted light and the −1-order diffracted light, respectively. The first beam spot 140 is received by divided photo-receiving areas 134, 135, 136 and 137 which are bounded by both a first dividing line crossing the optical axis and being parallel to the tangential line of the disk 126, and a second dividing line crossing the optical axis and being parallel to the radial direction. The second beam spot 141 is received by a single photo-receiving area 138. The third beam spot 142 is received by a single photo-receiving area 139. The alignment of the first, second and third beam spots 131, 132, and 133 are parallel to the tangential direction, whilst the alignment of the first, second and third beam spots 140, 141 and 142 are parallel to the radial direction perpendicular to the tangential direction due to the functions of the cylinder lens 127 and the additional lens 128.

Outputs from the photo-receiving areas 134 through 139 are represented by V134 to V139. Focus error signals are obtained by an astigmatism method, wherein an operation (V134+V137)−(V135+V136) is made. Track error signals are obtained by a push-pull method, wherein an operation (V134+V136)−(V135+V137) is made. A reproducing signal by the beam spot 131 is obtained by an operation (V134+V135+V136+V137).

The radial tilt of the disk 126 may be detectable by either one of the following two methods. First method is to obtain the radial tilt signal from the operation (V138−V139). Second method is to obtain the radial tilt signal from a difference in bit error rate of between a first reproducing signal by the beam spot 132 obtained from the V138 and a second reproducing signal by the beam spot 133 obtained from the V139.

If the radial tilt is detected by the above first method, then a variation of V138 and V139 with reference to the radial tilt is extremely small, for which reason it is difficult to realize a highly sensitive detection of the radial tilt. If the radial tilt is detected by the above second method, then it is necessary to measure the bit error rate in the reproducing signals, for which reason it is possible to detect the radial tilt for the reproducing only disk having already stored the signals, whilst it is impossible to detect the radial tilt for the write-enable disk.

In the above circumstances, it had been required to develop a novel optical head and a novel optical information recording/reproducing device free from the above problem.

SUMMARY OF THE INVENTION

Accordingly, it is an object of the present invention to provide a novel optical head capable of detecting a radial tilt of an optical storage medium free from the above problems.

It is a further object of the present invention to provide a novel optical head capable of a highly sensitive detection of a radial tilt of any types of optical storage mediums, for example, not only a reproducing only optical storage medium but also a write enable optical storage medium.

It is a still further object of the present invention to provide a novel optical information recording/reproducing device capable of detecting a radial tilt of an optical storage medium free from the above problems.

It is yet a further object of the present invention to provide a novel optical information recording/reproducing device capable of a highly sensitive detection of a radial tilt of any types of optical storage mediums, for example, not only a reproducing only optical storage medium but also a write enable optical storage medium.

The present invention provides an optical information recording/reproducing device which comprises a light source for emitting a light, a light transmitting system including an objective lens for focusing the emitted light onto an optical storage medium and a photo-detector system for detecting a reflected light from the optical storage medium, wherein before the light is incident into the objective lens, the light has been divided into a main beam and at least a sub-beam which are different in intensity distribution from each other, and the photo-detector system detects first and second track error signals from the main beam and the sub-beam separately, and said photo-detector system further obtains a difference in phase between the first and second track error signals in order to detect a radial tilt of the optical storage medium on the basis of the difference in phase, and further a compensation of the radial tilt is made on the basis of the detected radial tilt.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

Figure 1:
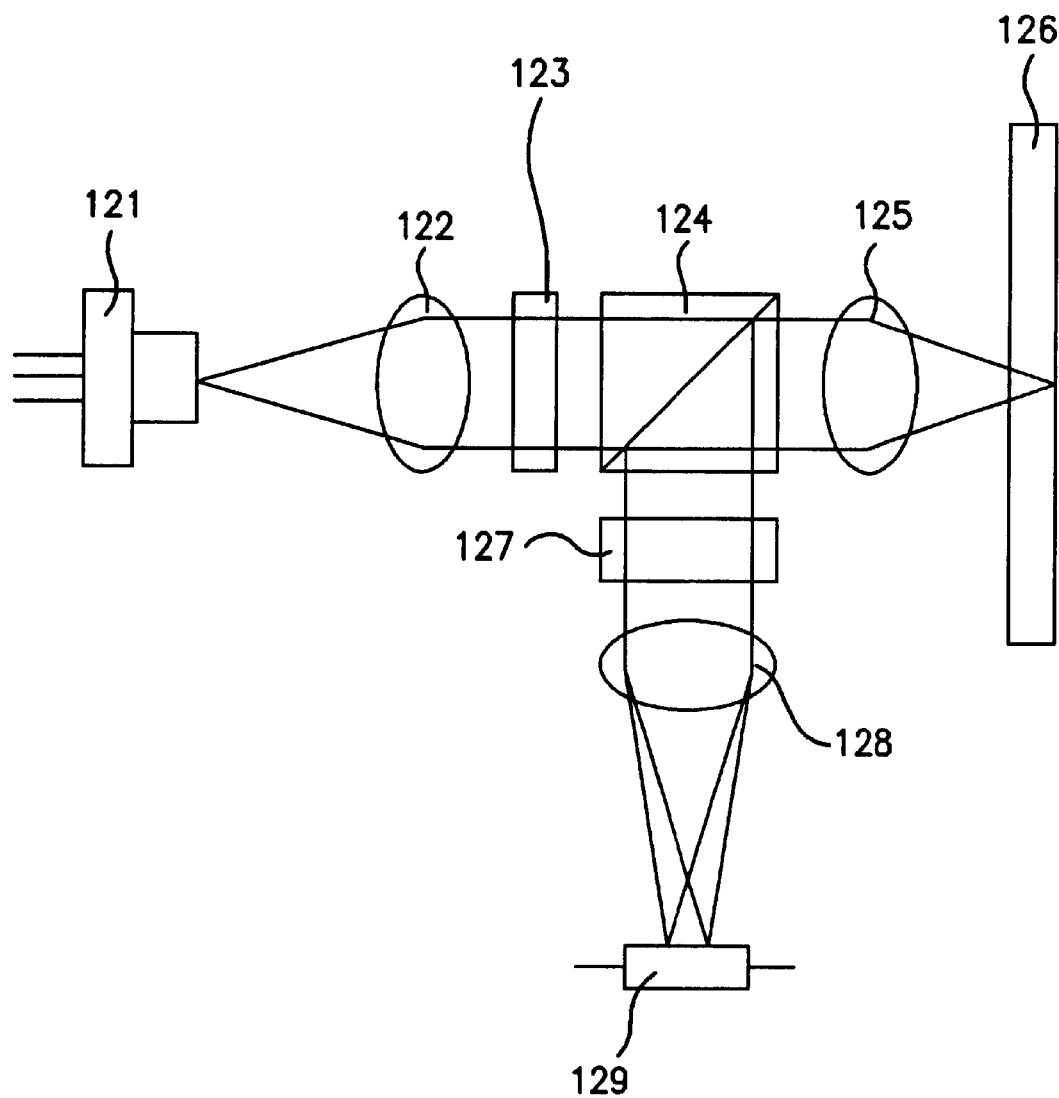
FIG. 1 is a schematic view illustrative of a first conventional optical head which is capable of detecting the radial tilt of the optical recording medium.
Figure 2:
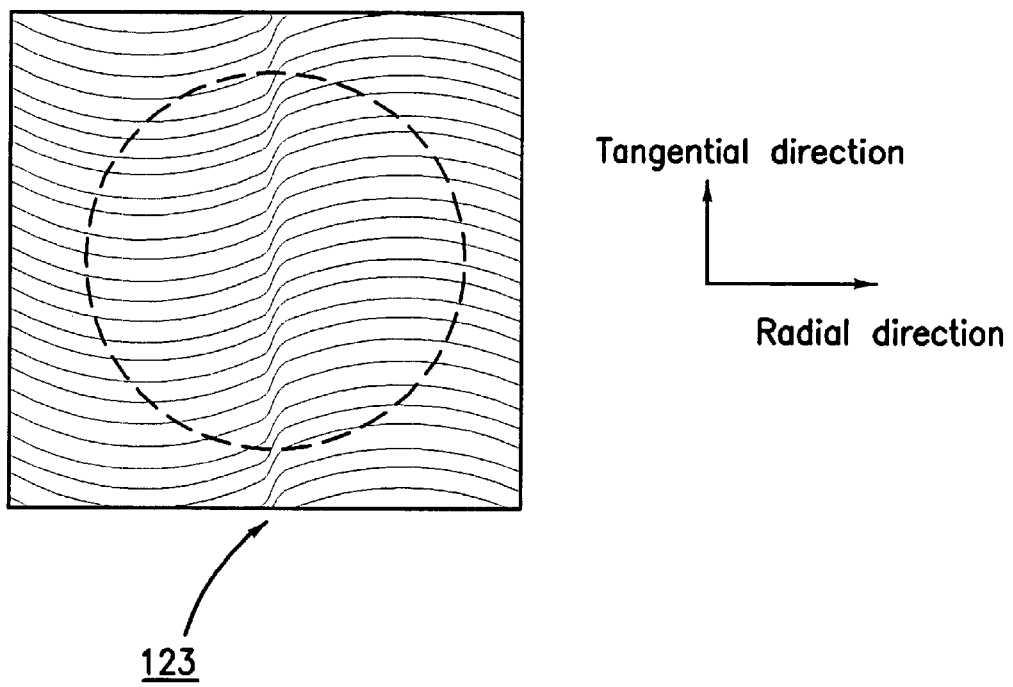
FIG. 2 is a plane view illustrative of the diffraction optical device of the first conventional optical head shown in FIG. 1.
Figure 3:
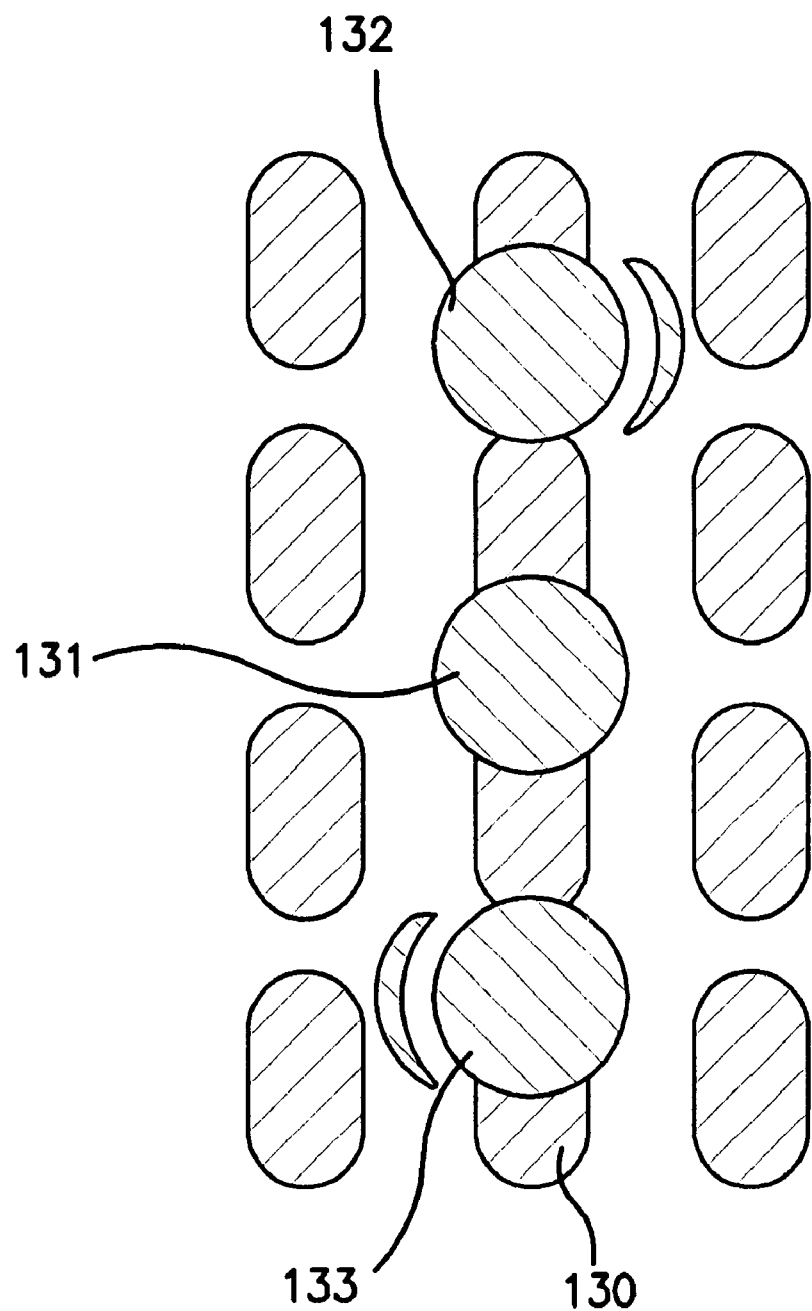
FIG. 3 is a plane view illustrative of an arrangement of beam spots of an alignment of tracks of the optical disk of the first conventional optical head shown in FIG. 1.
Figure 4:
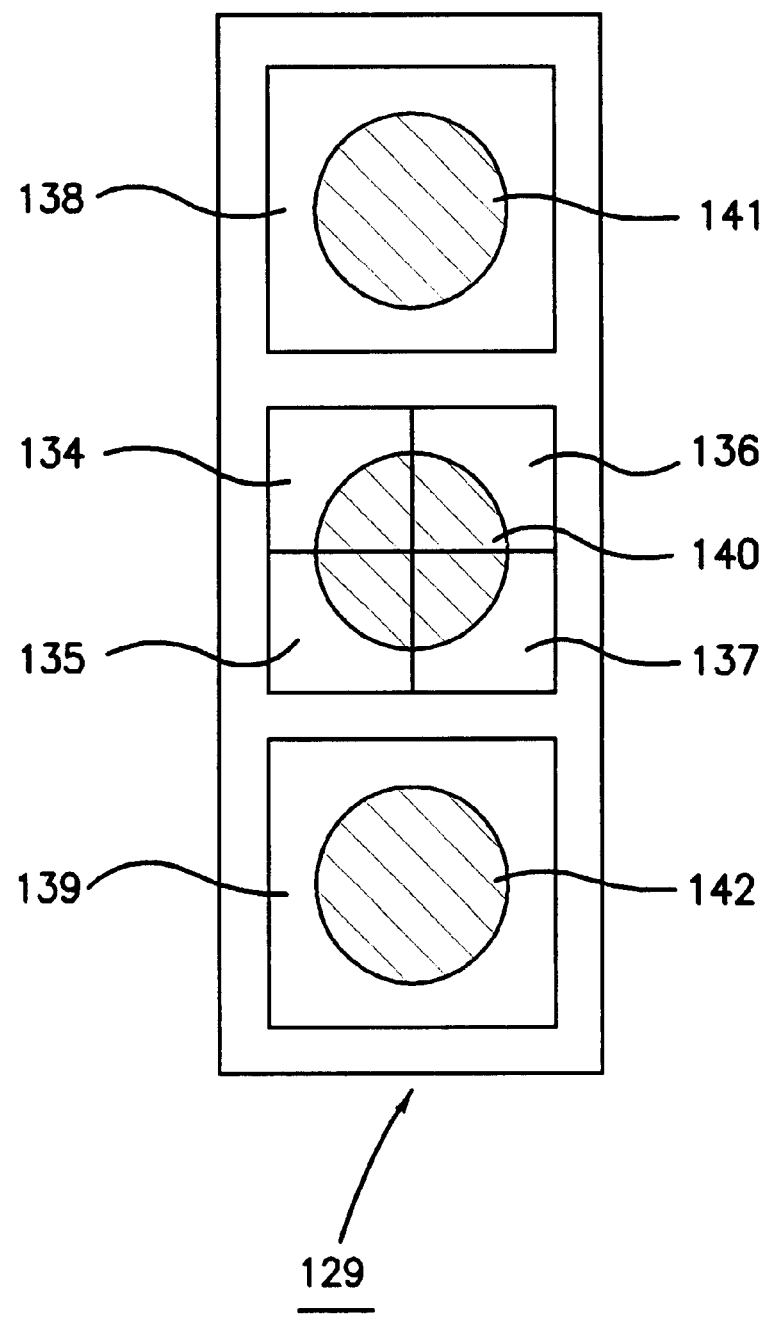
FIG. 4 is a plane view illustrative of an arrangement of the beam spots and an alignment of patterns of photo-receiving parts of the photo-detector in the first optical head shown in FIG. 1.

In accordance with the first present innovation, an optical head comprises a light source for emitting a light, a light transmitting system including an objective lens for focusing the emitted light onto an optical storage medium and a photo-detector system for detecting a reflected light from the optical storage medium, wherein before the light is incident into the objective lens, the light has been divided into a main beam and at least a sub-beam which are different in intensity distribution from each other, and the photo-detector system detects first and second track error signals from the main beam and the sub-beam separately, and said photo-detector system further obtains a difference in phase between the first and second track error signals in order to detect a radial tilt of the optical storage medium on the basis of the difference in phase.

It is preferable that the main beam and the sub-beam are focused on the same track of the optical storage medium.

It is also preferable that the light transmitting system further includes an optical diffraction device between the light source and the objective lens for dividing the light emitted from the light source into the main beam which comprises a transmitted light and the sub-beam which comprises at least one of +1-order diffracted light and −1-order diffracted light. The optical diffraction device may preferably be a polarization diffraction device.

It is further preferable that the optical diffraction device has a diffraction grating selectively existing only in an inside region of a circle having a smaller diameter than an effective diameter of the objective lens.

It is alternatively preferable that the optical diffraction device has a diffraction grating selectively existing only in an outside region of a circle having a smaller diameter than an effective diameter of the objective lens.

It is further alternatively preferable that the optical diffraction device has a diffraction grating selectively existing only in a stripe-shape region having a smaller width than an effective diameter of the objective lens.

It is also preferable that the light source comprises a first light source emitting the main beam and a second light source emitting the at least sub-beam.

It is further preferable that the light transmitting system further includes a light intensity distribution varying device on at least one of optical paths of the main beam and the sub-beam between the light source and the objective lens.

It is further more preferable that the second track error signal of the sub-beam is used as a radial tilt signal when a track servo is made with the first track error signal of the main beam.

It is further more alternatively preferable that a signal obtained by subtracting the first track error signal of the main beam from the second track error signal of the sub-beam is used as a radial tilt signal when a track servo is made with the first track error signal of the main beam.

It is further more alternatively preferable that a variation in phase of the second track error signal of the sub-beam from the first track error signal of the main beam is used as a radial tilt signal.

The second present invention provides an optical information recording/reproducing device which comprises a light source for emitting a light, a light transmitting system including an objective lens for focusing the emitted light onto an optical storage medium and a photo-detector system for detecting a reflected light from the optical storage medium, wherein before the light is incident into the objective lens, the light has been divided into a main beam and at least a sub-beam which are different in intensity distribution from each other, and the photo-detector system detects first and second track error signals from the main beam and the sub-beam separately, and said photo-detector system further obtains a difference in phase between the first and second track error signals in order to detect a radial tilt of the optical storage medium on the basis of the difference in phase, and further a compensation of the radial tilt is made on the basis of the detected radial tilt.

It is preferable that the compensation of the radial tilt is made by tilting the objective lens in a radial direction of the optical storage medium.

It is also preferable that the compensation of the radial tilt is made by tilting the optical head in a radial direction of the optical storage medium.

It is also preferable that the light transmitting system further includes a liquid crystal optical device applied with a control voltage on an optical path between the light source and the objective lens for making the compensation of the radial tilt.

It is also preferable that the second track error signal of the sub-beam is used as a radial tilt signal when a track servo is made with the first track error signal of the main beam, and a polarization of a circuit for making the compensation of the radial tilt is switched with lands and grooves of the optical storage medium.

It is preferable that a signal obtained by subtracting the first track error signal of the main beam from the second track error signal of the sub-beam is used as a radial tilt signal when a track servo is made with the first track error signal of the main beam, and a polarization of a circuit for making the compensation of the radial tilt is switched with lands and grooves of the optical storage medium.

The third present invention provides a method of detecting a radial tilt of an optical storage medium with reference to an optical head, wherein before a light is incident into an objective lens, the light has been divided into a main beam and at least a sub-beam which are different in intensity distribution from each other, and first and second track error signals detected from the main beam and the sub-beam separately, and a difference in phase between the first and second track error signals is obtained in order to detect a radial tilt of the optical storage medium on the basis of the difference in phase.

It is preferable that the main beam and the sub-beam are focused on the same track of the optical storage medium.

It is also preferable that the light is diffracted for dividing the light into the main beam which comprises a transmitted light and the sub-beam which comprises at least one of +1-order diffracted light and −1-order diffracted light.

It is also preferable that the second track error signal of the sub-beam is used as a radial tilt signal when a track servo is made with the first track error signal of the main beam.

It is also preferable that a signal obtained by subtracting the first track error signal of the main beam from the second track error signal of the sub-beam is used as a radial tilt signal when a track servo is made with the first track error signal of the main beam.

It is also preferable that a variation in phase of the second track error signal of the sub-beam from the first track error signal of the main beam is used as a radial tilt signal.

The fourth present invention provides a method of making a compensation to a radial tilt of an optical storage medium with reference to an optical head, wherein before a light is incident into an objective lens, the light has been divided into a main beam and at least a sub-beam which are different in intensity distribution from each other, and first and second track error signals are detected from the main beam and the sub-beam separately, and a difference in phase between the first and second track error signals is obtained in order to detect a radial tilt of the optical storage medium on the basis of the difference in phase, and further a compensation of the radial tilt is made on the basis of the detected radial tilt.

It is preferable that the compensation of the radial tilt is made by tilting the objective lens in a radial direction of the optical storage medium.

It is preferable that the compensation of the radial tilt is made by tilting the optical head in a radial direction of the optical storage medium.

It is preferable that the light transmitting system further includes a liquid crystal optical device applied with a control voltage on an optical path between the light source and the objective lens for making the compensation of the radial tilt.

It is preferable that the second track error signal of the sub-beam is used as a radial tilt signal when a track servo is made with the first track error signal of the main beam, and a polarization of a circuit for making the compensation of the radial tilt is switched with lands and grooves of the optical storage medium.

It is preferable that a signal obtained by subtracting the first track error signal of the main beam from the second track error signal of the sub-beam is used as a radial tilt signal when a track servo is made with the first track error signal of the main beam, and a polarization of a circuit for making the compensation of the radial tilt is switched with lands and grooves of the optical storage medium.

In accordance with the above described present inventions, the main beam and the sub-beam are incident into the objective lens, wherein the main beam and the sub-beam are different in intensity distributions, so that the first track error signal is detected from the main beam and the second track error signal is also detected from the sub-beam, when the focused beam spot makes across the track in the radial direction of the optical storage medium.

If the optical storage medium has no radial tilt, then the main beam and the sub-beam have the correspondent peak position to each other of the focused beam spot in the radial direction of the optical storage medium. Accordingly, the main beam and the sub-beam have the correspondence to each other in phase of the track error signal. Namely, the first and second track error signals of the main beam and the sub-beam are corespondent to each other in its phase.

If the optical storage medium has a certain radial tilt, then the peak position of the focused beam spot in the radial direction of the optical storage medium is displaced due to the frame aberration which is caused by a substrate of the optical storage medium. Since the main beam and the sub-beam are different from each other in the intensity distribution upon incidence into the objective lens, then the main beam and the sub-beam are different from each other in the displacements of the peak position of the focused beam spot in the radial direction. Accordingly, the main beam and the sub-beam have different peak positions of the focused beam spot in the radial direction. Thus, the main beam and the sub-beam are different in phase of the track error signal. Namely, the first and second track error signals of the main beam and the sub-beam are different to each other in its phase. The radial tilt is obtained from the difference in phase of the first and second track error signals of the main beam and the sub-beam.

The optical information recording/reproducing device utilizes the optical head which is capable of detecting the radial tilt of the optical storage medium for making the compensation of the radial tilt of the optical storage medium in order to reduce the deterioration of the recording/reproducing characteristics.

Upon detection of the radial tilt, the main beam and the sub-beam are largely different in the phase of the track error signal with reference to the radial tilt. This makes it possible to realize a highly sensitive detection of the radial tilt. Upon the detection of the radial tilt, the radial tilt signal is obtained from the difference in phase of the first and second track error signals of the main beam and the sub-beam, for which reason it is possible to detect the radial tilt if the optical storage medium is a write-enable optical disk.

PREFERRED EMBODIMENT

Figure 5:
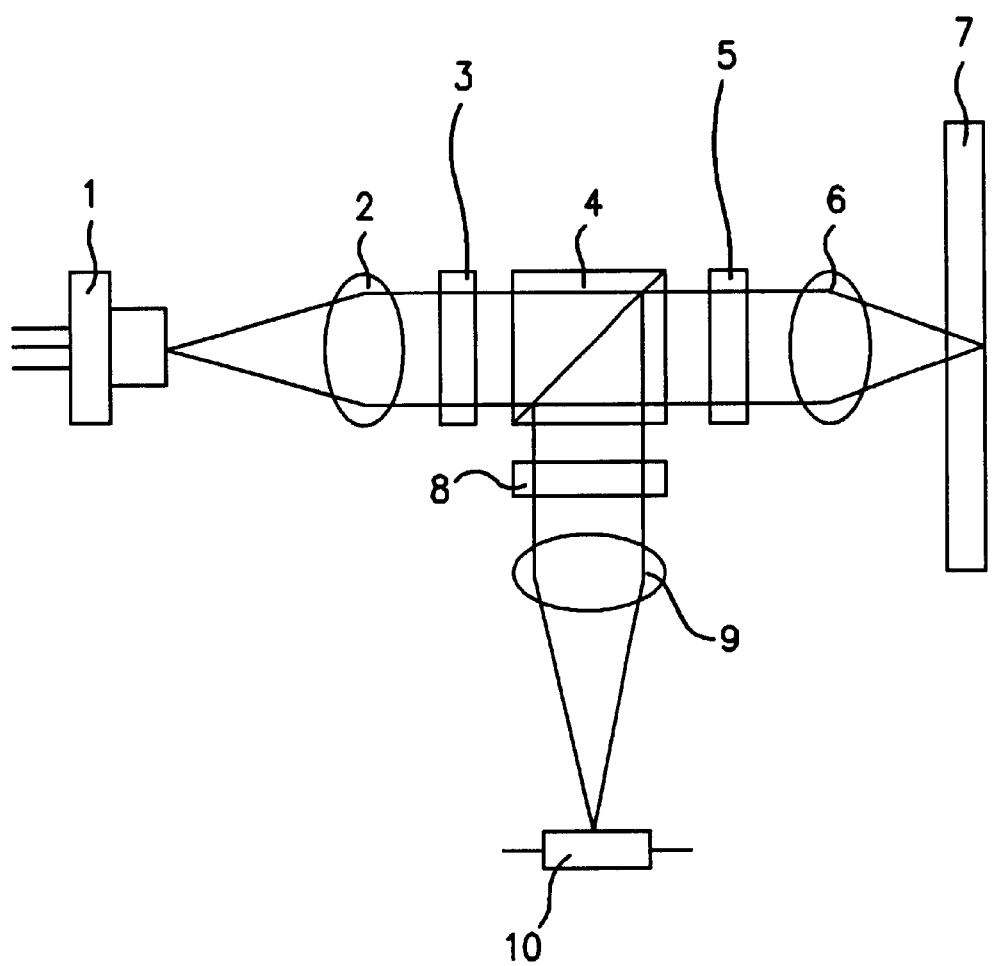
FIG. 5 is a schematic view illustrative of a first novel optical head which is capable of detecting the radial tilt of the optical recording medium in one preferred embodiment according to the present invention.

Preferred embodiments according to the present invention will be described in detail with reference to the drawings. FIG. 5 is a schematic view illustrative of a first novel optical head which is capable of detecting the radial tilt of the optical recording medium in one preferred embodiment according to the present invention. The first novel optical head has a semiconductor laser 1, a collimator lens 2, a diffraction optical device 3, a polarization beam splitter 4, a quarter-wavelength plate 5, an objective lens 6, an optical disk 7, a hologram optical device 8, an additional lens 9 and a photo-detector 10. A laser beam is emitted from the semiconductor laser 1, and transmitted through the collimator lens 2 where the laser beam is collimated. The collimated laser beam is then transmitted through the diffraction optical device 3, where the collimated laser beam is divided into three parts, for example, 0-order light, +1-order diffracted light, and −1-order diffracted light. The divided three lights reach the polarization beam splitter 4 in a P-polarization direction, wherein almost 100% of the divided three lights pass through the polarization beam splitter 4 and then are transmitted through the quarter-wavelength plate 5, wherein the three lights are converted from the liner polarization to the circular polarization. The circular-polarized three lights are then transmitted through the objective lens 6, wherein the lights are focused onto the optical disk 7. The lights are then reflected from the optical disk 7 and further transmitted through the objective lens 6 to reach the quarter-wavelength plate 5, wherein the lights are converted from the circular polarization to the liner polarization but in an S-polarization direction perpendicular to the P-polarization direction. The S-polarized lights reach the polarization beam splitter 4, wherein almost 100% of the S-polarized three lights are reflected by the polarization beam splitter 4. The three lights are then transmitted through the hologram optical device 8, wherein the lights are subjected to the diffraction of most of the +1-order diffracted light. The three lights are the transmitted through the additional lens 9 to reach the photo-detector 10.

Figure 6:
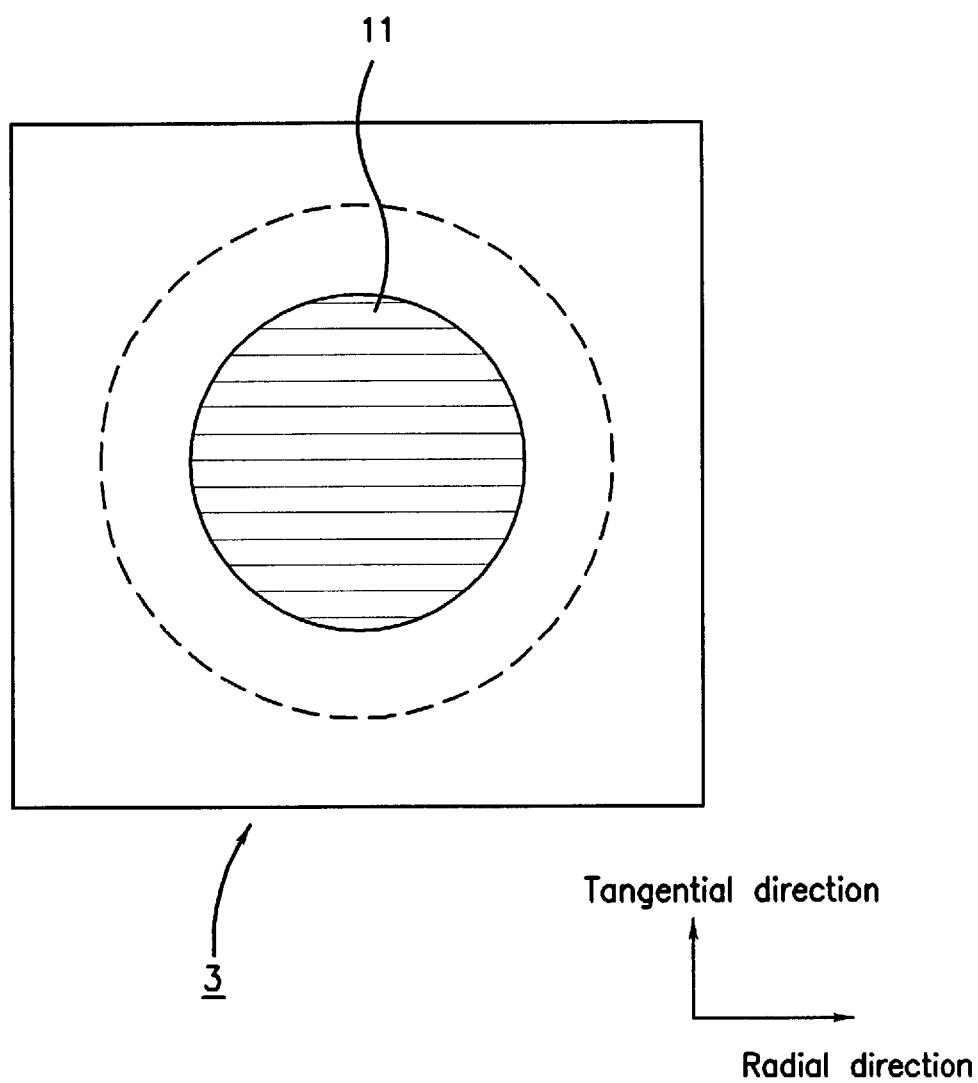
FIG. 6 is a plane view illustrative of the diffraction optical device of the first novel optical head shown in FIG. 5.

FIG. 6 is a plane view illustrative of the diffraction optical device of the first novel optical head shown in FIG. 5. The diffraction optical device 3 has a circular-shaped region 11 which is encompassed by a broken line which corresponds to a circumference of the objective lens 6, wherein the circular-shaped region 11 has a smaller diameter than the objective lens 6. A diffraction grating is selectively formed only in the circular-shaped region 11. The grating direction of the diffraction grating is parallel to the radial direction of the optical disk 7. The diffraction grating has a grating pattern which has a constant pitch alignment of plural straight line segments which are parallel to the radial direction perpendicular top the tangential direction. The diffraction grating comprises the alternating alignments of the line segments and space regions. If a difference in phase between the line segments and space regions of the diffraction grating is, for example, $0.232\pi$, then about 87.3% of the light incident into the circular-shaped region 11 is transmitted through the diffraction optical device 3, whilst about 5.1% of the incident light is diffracted to become the +1-order diffracted light and further about 5.1% of the incident light is diffracted to become the −1-order diffracted light. The light incident into the outside region of the circular-shaped region 11 is transmitted through the diffraction optical device 3 at almost 100%. The main beam comprises not only the about 87.3% of the light incident into the circular-shaped region 11 and the light incident into the outside region of the circular-shaped region 11, for which reason the numerical number to the main beam depends upon the effective diameter of the objective lens 6. The sub-beam includes only the +1-order diffracted light and the −1-order diffracted light, for which reason the numerical number to the sub-beam depends upon the effective diameter of the circular-shaped region 11. As a result, the main beam and the sub-beam are different in intensity distribution from each other upon incidence into the objective lens 6.

Figure 7:
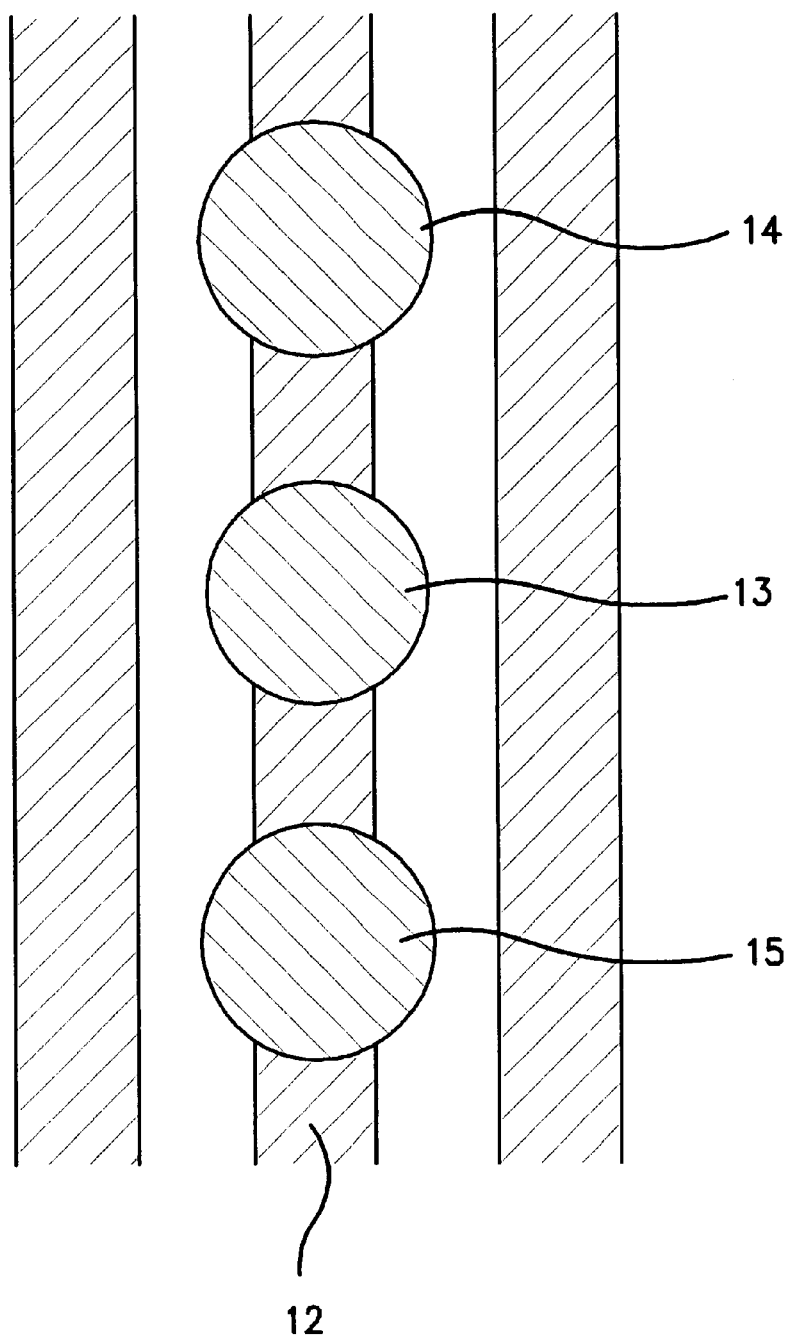
FIG. 7 is a plane view illustrative of an arrangement of beam spots of an alignment of tracks of the optical disk of the first novel optical head shown in FIG. 5.

FIG. 7 is a plane view illustrative of an arrangement of beam spots of an alignment of tracks of the optical disk of the first novel optical head shown in FIG. 5. First, second and third beam spots 13, 14, and 15 correspond to the non-diffracted light, the +1-order diffracted light and the −1-order diffracted light, respectively. The first, second and third beam spots 13, 14, and 15 are aligned on a single track 12. Each of the tracks 12 has a single alignment of lands and grooves, wherein the lands correspond to the valley portions of the pits and the grooves correspond to the ridged portions. Both the lands and the grooves are used as the track. The second and third beam spots 14 and 15 as the sub-beams are larger in diameter than the first beam spot 13 as the main beam because the sub-beam is smaller in numerical number than the main beam.

Figure 8:
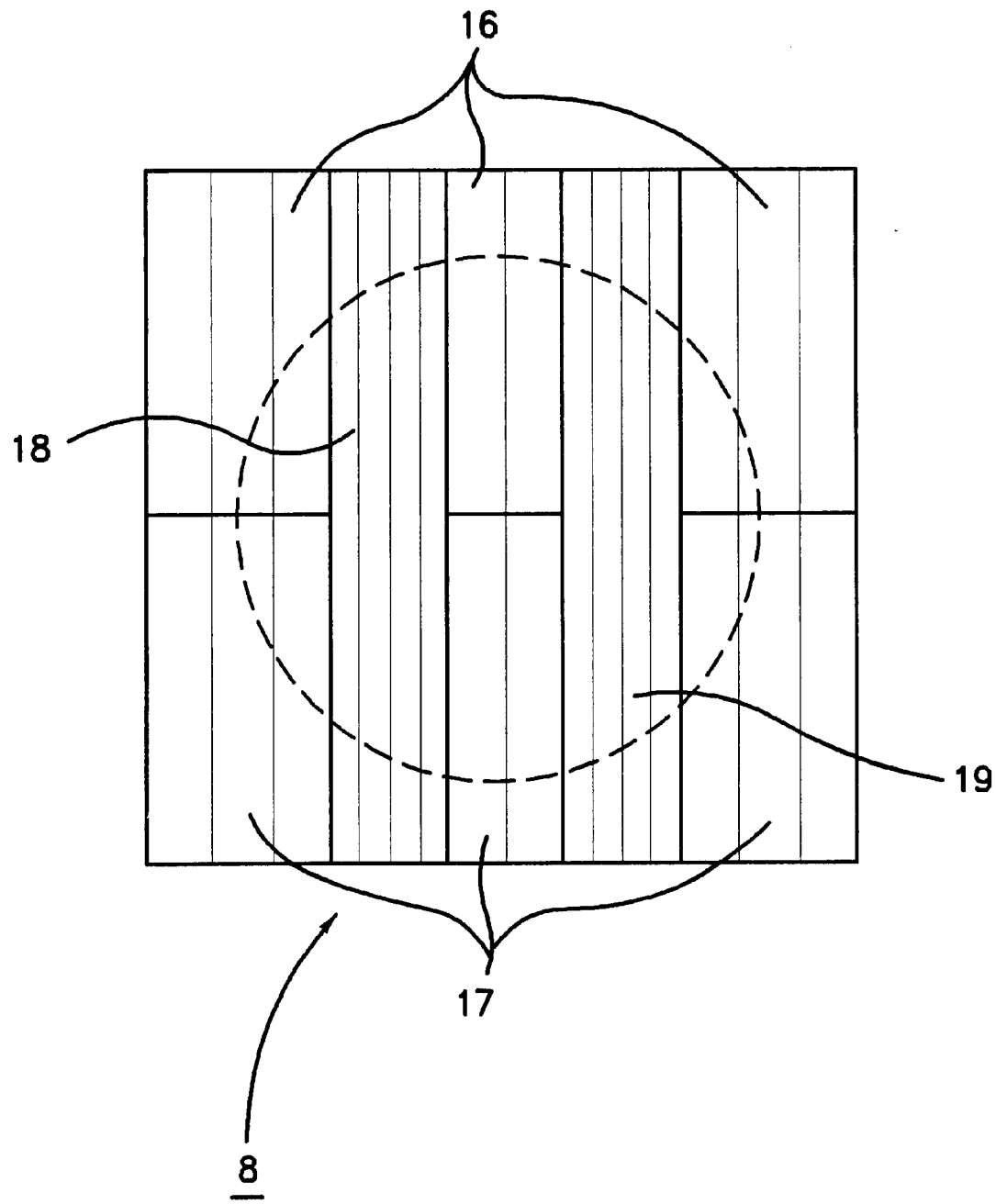
FIG. 8 is a plane view illustrative of a hologram optical device of the first novel optical head shown in FIG. 5.

FIG. 8 is a plane view illustrative of a hologram optical device of the first novel optical head shown in FIG. 5. The hologram optical device 8 is divided into five regions by four dividing lines parallel to the tangential direction, and further each of three of the five divided regions are further divided into two regions by dividing lines parallel to the radial direction. As a result, the hologram optical device 8 comprises three of a first type region 16, three of a second type region 17, a third type region 18 and a fourth type region 19. The grating direction is fixed in parallel to the tangential direction throughout the first, second, third and fourth type regions 16, 17, 18 and 19. Each of the first, second, third and fourth type regions 16, 17, 18 and 19 has an individual grating pattern having an individual distance of the grating. The first and second type regions 16 and 17 have the same grating distance or pitch. The third and fourth type regions 18 and 19 have the same grating distance or pitch. The grating distance or pitch of the first and second type regions 16 and 17 is larger than the grating distance or pitch of the third and fourth type regions 18 and 19. Each of the first, second, third and fourth type regions 16, 17, 18 and 19 has the same grating cross sectional shape in saw-toothed shape. If the difference in phase between the valley portion and the ridge portion of the saw-toothed shape grating is $2\pi$, almost 100% of the light incident into each of the first, second, third and fourth type regions 16, 17, 18 and 19 is diffracted as the +1-order diffracted light. The saw-toothed shape of the first and third regions 16 and 18 is so directed that the +1-order diffracted light is polarized in a left direction in FIG. 8. The saw-toothed shape of the second and fourth type regions 17 and 19 is so directed that the +1-order diffracted light is polarized in a right direction in FIG. 8.

Figure 9:
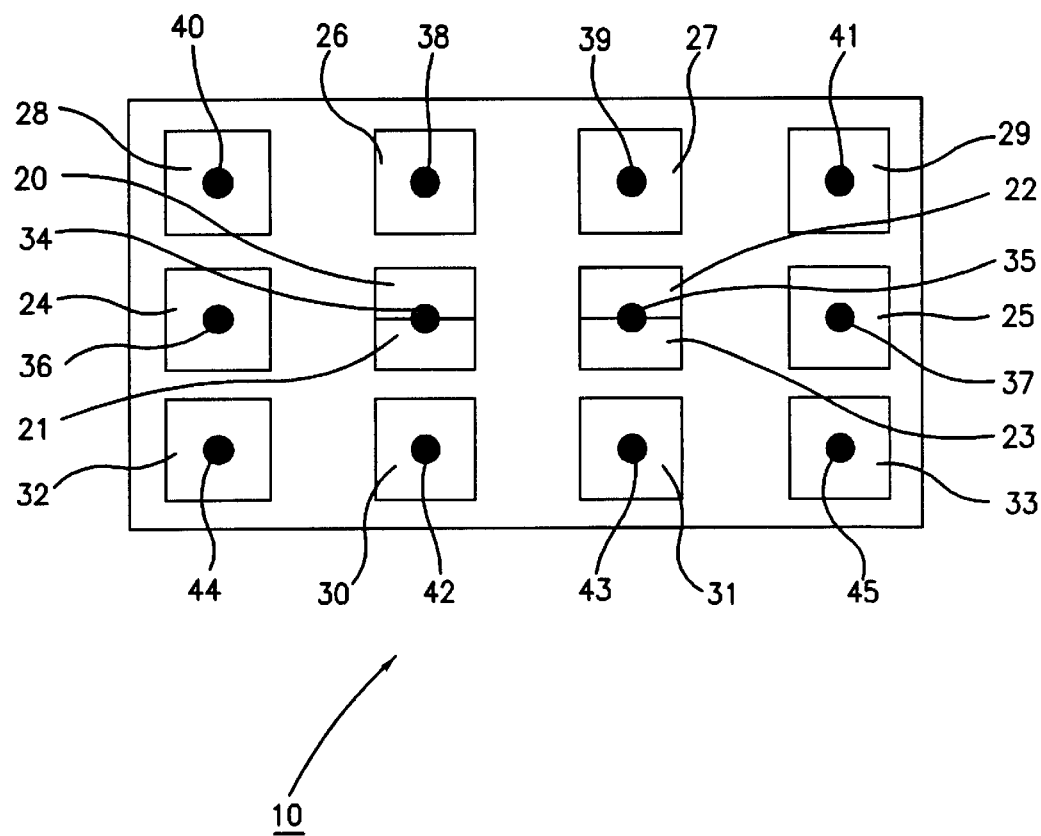
FIG. 9 is a plane view illustrative of an arrangement of beam spots and a pattern of photo-receiving portions of a photo-detector of a first novel optical head shown in FIG. 5.

FIG. 9 is a plane view illustrative of an arrangement of beam spots and a pattern of photo-receiving portions of a photo-detector of a first novel optical head shown in FIG. 5. A beam spot 34 corresponds to a +1-ordr diffracted light transmitted from the first type region 16 of the hologram optical device 8. The beam spot 34 is focused onto a boundary line bounding two divided photo-receiving regions 20 and 21, wherein the boundary line is parallel to the radial direction of the optical disk 7. A beam spot 35 corresponds to a +1-ordr diffracted light transmitted from the second type region 17 of the hologram optical device 8. The beam spot 35 is focused onto a boundary line bounding two divided photo-receiving regions 22 and 23, wherein the boundary line is parallel to the radial direction of the optical disk 7. A beam spot 36 corresponds to a +1-ordr diffracted light transmitted from the third type region 18 of the hologram optical device 8. The beam spot 36 is focused onto a non-divided single photo-receiving region 24. A beam spot 37 corresponds to a +1-ordr diffracted light transmitted from the fourth type region 19 of the hologram optical device 8. The beam spot 37 is focused onto a non-divided single photo-receiving region 25. A beam spot 38 corresponds to a +1-ordr diffracted light transmitted from the first type region 16 of the hologram optical device 8. The beam spot 38 is focused onto a non-divided single photo-receiving region 26. A beam spot 39 corresponds to a +1-ordr diffracted light transmitted from the second type region 17 of the hologram optical device 8. The beam spot 39 is focused onto a non-divided single photo-receiving region 27. A beam spot 40 corresponds to a +1-ordr diffracted light transmitted from the third type region 18 of the hologram optical device 8. The beam spot 40 is focused onto a non-divided single photo-receiving region 28. A beam spot 41 corresponds to a +1-ordr diffracted light transmitted from the fourth type region 19 of the hologram optical device 8. The beam spot 41 is focused onto a non-divided single photo-receiving region 29. A beam spot 42 corresponds to a +1-ordr diffracted light transmitted from the first type region 16 of the hologram optical device 8. The beam spot 42 is focused onto a non-divided single photo-receiving region 30. A beam spot 43 corresponds to a +1-ordr diffracted light transmitted from the second type region 17 of the hologram optical device 8. The beam spot 43 is focused onto a non-divided single photo-receiving region 31. A beam spot 44 corresponds to a +1-ordr diffracted light transmitted from the third type region 18 of the hologram optical device 8. The beam spot 44 is focused onto a non-divided single photo-receiving region 32. A beam spot 45 corresponds to a +1-ordr diffracted light transmitted from the fourth type region 19 of the hologram optical device 8. The beam spot 45 is focused onto a non-divided single photo-receiving region 33.

Outputs from the photo-receiving regions 20–33 are represented as V20–V33 respectively. A focus error signal is obtained in a Foucault's method by an operation of (V20+V23)−(V21+V22). A track error signal from the focused beam spot 13 of the main beam is obtained in a push-pull method by an operation of (V24−V25). A reproducing signal from the focused beam spot 13 of the main beam is obtained by an operation of (V20+V21+V22+V23+V24+V25). A track error signal from the focused beam spots 14 and 15 of the sub-beam is obtained in a push-pull method by an operation of (V28+V32)−(V29+V33).

Figure 10A:
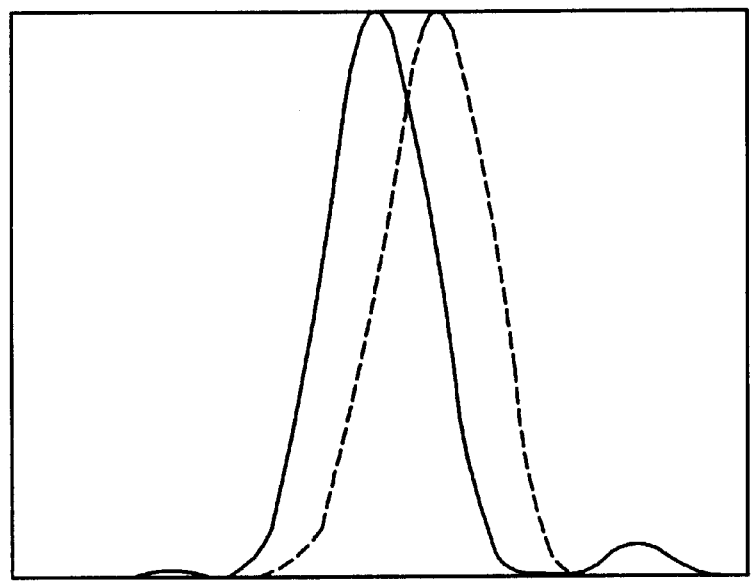
FIG. 10A is a view illustrative of a calculated intensity distribution of a main beam focused spot, wherein a real line represent the intensity distribution in case of radial tilt of 0 degree, and a broken line represent the intensity distribution in case of radial tilt of +0.5 degrees.
Figure 10B:
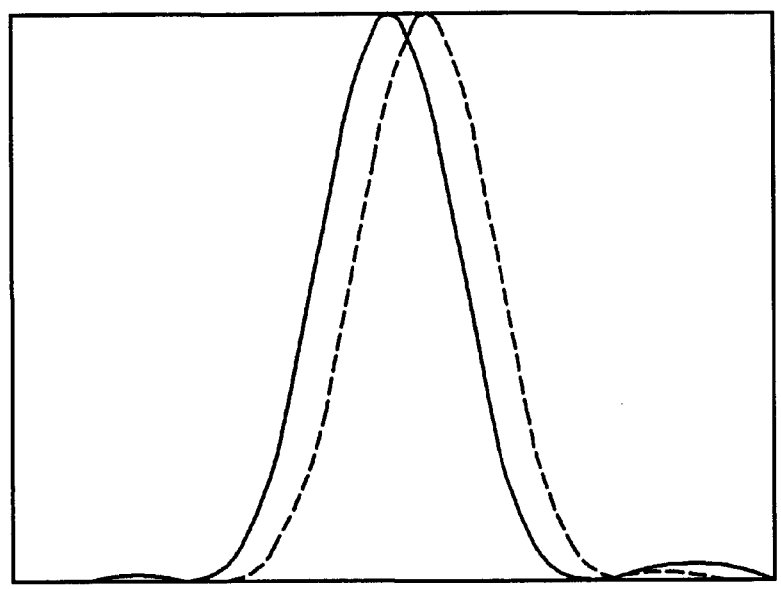
FIG. 10B is a view illustrative of a calculated intensity distribution of a sub-beam focused spot, wherein a real line represent the intensity distribution in case of radial tilt of 0 degree of the optical disk, and a broken line represent the intensity distribution in case of radial tilt of +0.5 degrees of the optical disk.

A method of detecting the radial tilt of the optical disk 7 will be described with reference to FIGS. 10A, 10B, 11A, 11B, 12A, 12B, 13A, 13B, and 14. FIG. 10A is a view illustrative of a calculated intensity distribution of a main beam focused spot, wherein a real line represent the intensity distribution in case of radial tilt of 0 degree, and a broken line represent the intensity distribution in case of radial tilt of +0.5 degrees. FIG. 10B is a view illustrative of a calculated intensity distribution of a sub-beam focused spot, wherein a real line represent the intensity distribution in case of radial tilt of 0 degree of the optical disk, and a broken line represent the intensity distribution in case of radial tilt of +0.5 degrees of the optical disk. The calculations of the intensity distributions of the main beam focused spot 13 and the sub-beam focused spots 14 and 15 are made under the conditions that a light emitted from the semiconductor laser 1 has a wavelength of 660 nanometers, the numerical number of the main beam is 0.65, the numerical number of the sub-beam is 0.5, and the optical disk has a substrate thickness of 0.6 millimeters.

If the radial tilt of the optical disk is 0 degree, then the main beam and the sub-beam are correspondent to each other in the peak position of the focused beam spot. The focused sub-beam spot is larger in diameter than the focused main beam spot because the focused sub-beam spot is smaller in numerical number than the focused main beam spot.

If the radial tilt of the optical disk is +0.5 degrees, then the peak positions of the focused main beam spot and the focused sub-beam spot are displaced in a right direction in the drawing. Since the focused sub-beam spot is smaller in numerical number than the focused main beam spot, the amount of the displacement of the peak position of the focused sub-beam spot is smaller than the amount of the displacement of the peak position of the focused main beam spot. If the radial tilt appears on the optical disk, then the peak position of the focused sub-beam spot is left side of the peak positions of the focused main beam spot in the drawing. Side lobes appear on the right side of both the focused main beam spot and the focused sub-beam spot. Since the focused sub-beam spot is smaller in numerical number than the focused main beam spot, then the side lobe of the focused sub-beam spot is smaller in height than the side lobe of the focused main beam spot.

Figure 11A:
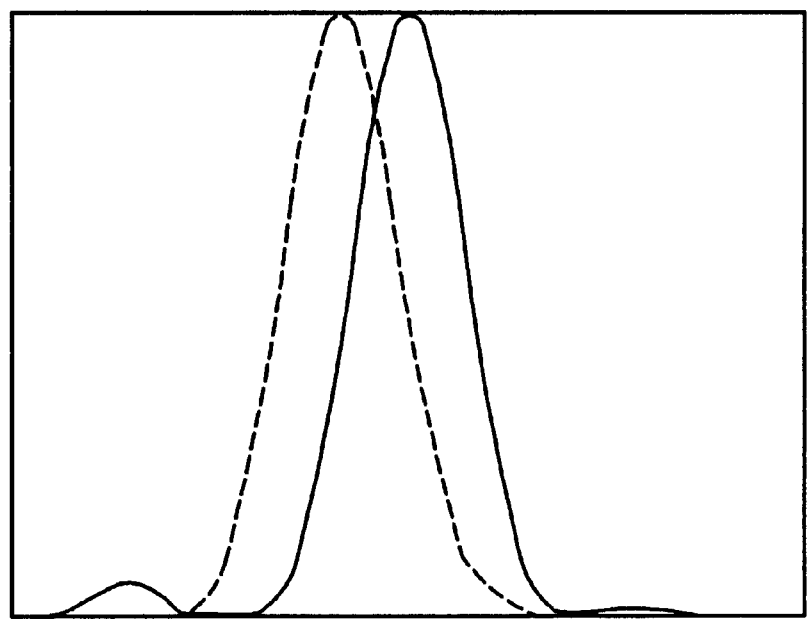
FIG. 11A is a view illustrative of a calculated intensity distribution of a main beam focused spot, wherein a real line represent the intensity distribution in case of radial tilt of 0 degree, and a broken line represent the intensity distribution in case of radial tilt of −0.5 degrees.
Figure 11B:
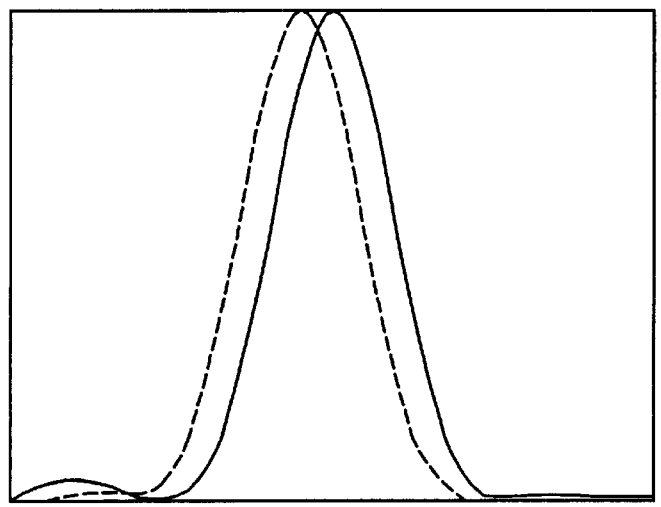
FIG. 11B is a view illustrative of a calculated intensity distribution of a sub-beam focused spot, wherein a real line represent the intensity distribution in case of radial tilt of 0 degree of the optical disk, and a broken line represent the intensity distribution in case of radial tilt of −0.5 degrees of the optical disk.

FIG. 11A is a view illustrative of a calculated intensity distribution of a main beam focused spot, wherein a real line represent the intensity distribution in case of radial tilt of 0 degree, and a broken line represent the intensity distribution in case of radial tilt of −0.5 degrees. FIG. 11B is a view illustrative of a calculated intensity distribution of a sub-beam focused spot, wherein a real line represent the intensity distribution in case of radial tilt of 0 degree of the optical disk, and a broken line represent the intensity distribution in case of radial tilt of −0.5 degrees of the optical disk. The calculations of the intensity distributions of the main beam focused spot 13 and the sub-beam focused spots 14 and 15 are made under the conditions that a light emitted from the semiconductor laser 1 has a wavelength of 660 nanometers, the numerical number of the main beam is 0.65, the numerical number of the sub-beam is 0.5, and the optical disk has a substrate thickness of 0.6 millimeters.

If the radial tilt of the optical disk is 0 degree, then the main beam and the sub-beam are correspondent to each other in the peak position of the focused beam spot. The focused sub-beam spot is larger in diameter than the focused main beam spot because the focused sub-beam spot is smaller in numerical number than the focused main beam spot.

If the radial tilt of the optical disk is −0.5 degrees, then the peak positions of the focused main beam spot and the focused sub-beam spot are displaced in a left direction in the drawing. Since the focused sub-beam spot is smaller in numerical number than the focused main beam spot, the amount of the displacement of the peak position of the focused sub-beam spot is smaller than the amount of the displacement of the peak position of the focused main beam spot. If the radial tilt appears on the optical disk, then the peak position of the focused sub-beam spot is right side of the peak positions of the focused main beam spot in the drawing. Side lobes appear on the left side of both the focused main beam spot and the focused sub-beam spot. Since the focused sub-beam spot is smaller in numerical number than the focused main beam spot, then the side lobe of the focused sub-beam spot is smaller in height than the side lobe of the focused main beam spot.

Figure 12A:
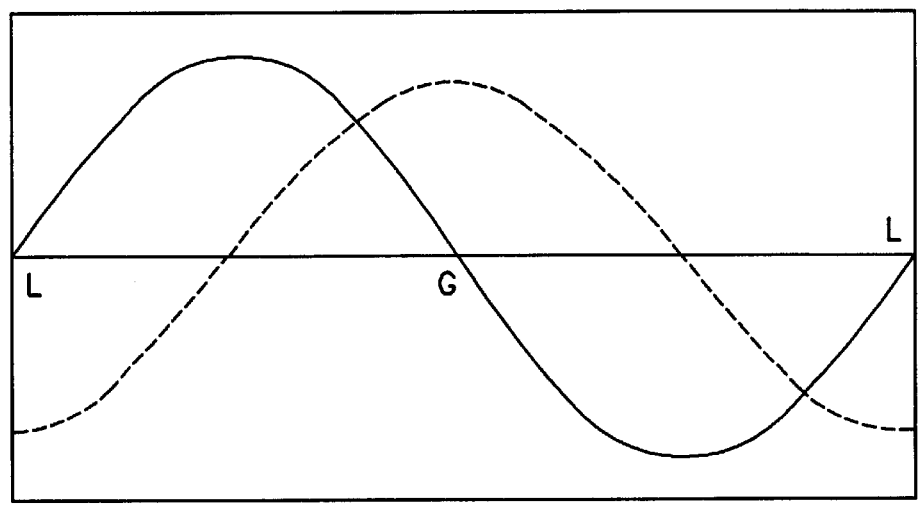
FIG. 12A is a diagram illustrative of calculated track error signals of a main beam when the focused main beam spot across the track of the optical disk in the radial direction in case of the tilt angles of 0 degree and +0.5 degrees, wherein the calculation of the track error signals is made in accordance with the push-pull method, and the real line represents the track error signal in case of the tilt angle of 0 degree, whilst the broken line represents the track error signal in case of the tilt angle of +0.5 degrees.
Figure 12B:
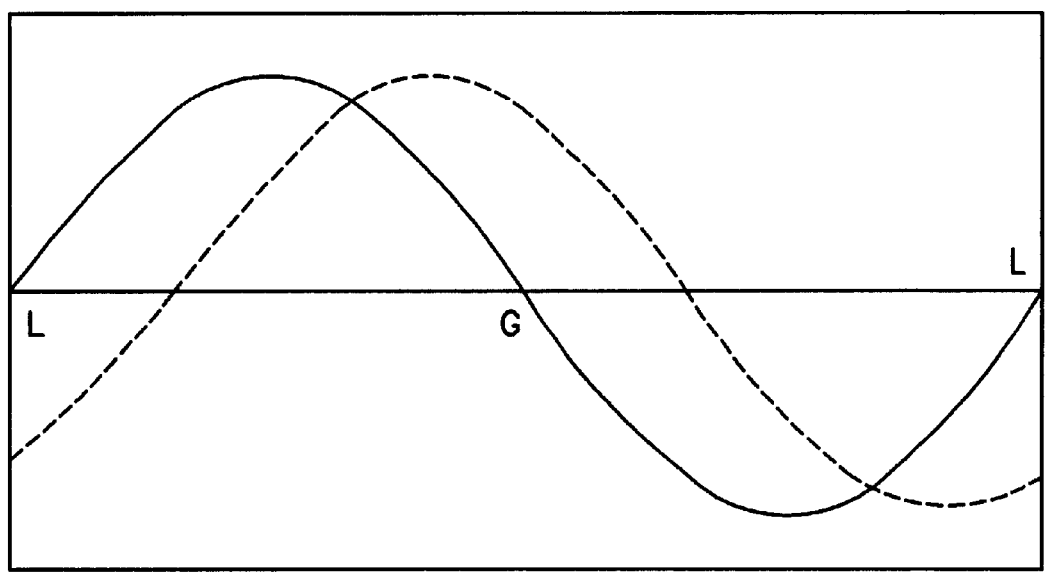
FIG. 12B is a diagram illustrative of calculated track error signals of a sub-beam when the focused sub-beam spot across the track of the optical disk in the radial direction in case of the tilt angles of 0 degree and +0.5 degrees, wherein the calculation of the track error signals is made in accordance with the push-pull method, and the real line represents the track error signal in case of the tilt angle of 0 degree, whilst the broken line represents the track error signal in case of the tilt angle of +0.5 degrees.

FIG. 12A is a diagram illustrative of calculated track error signals of a main beam when the focused main beam spot across the track of the optical disk in the radial direction in case of the tilt angles of 0 degree and +0.5 degrees, wherein the calculation of the track error signals is made in accordance with the push-pull method, and the real line represents the track error signal in case of the tilt angle of 0 degree, whilst the broken line represents the track error signal in case of the tilt angle of +0.5 degrees. FIG. 12B is a diagram illustrative of calculated track error signals of a sub-beam when the focused sub-beam spot across the track of the optical disk in the radial direction in case of the tilt angles of 0 degree and +0.5 degrees, wherein the calculation of the track error signals is made in accordance with the push-pull method, and the real line represents the track error signal in case of the tilt angle of 0 degree, whilst the broken line represents the track error signal in case of the tilt angle of +0.5 degrees. The calculations are made under the conditions that a light emitted from the semiconductor laser 1 has a wavelength of 660 nanometers, the numerical number of the main beam is 0.65, the numerical number of the sub-beam is 0.5, the optical disk has a substrate thickness of 0.6 millimeters, a track pitch of the optical disk is 0.5 micrometers, and a groove depth of the optical disk is 70 nanometers. In the drawings, illustrated signal waveform corresponds to the track error signals of one period of the groove. The character "L" represents the lands whilst the character "G" represents the groove. Namely, the position of the track error signal across 0-point from the minus side to the plus side corresponds to the land (L), whilst the position of the track error signal across 0-point from the plus side to the minus side corresponds to the land (G). The track error signal is normalized with the sum signal of the incident main beam and the incident sub-beam into the optical disk.

If the radial tile of the optical disk 7 is 0 degree, then the main beam and the sub-beam are correspondent in the peak position of the focused beam spot, for which reason the main beam and the sub-beam are correspondent in the phase of the track error signal. Since the focused sub-beam spot is larger in diameter than the focused main beam spot, the track error signal of the sub-beam is slightly smaller in amplitude than the track error signal of the main beam.

If he radial tile of the optical disk 7 is +0.5 degrees, then the peak positions of the focused sub-beam spot and the focused main beam spot are displaced in the right direction of the drawing, for which reason the phases of the track error signals of the main beam and the sub-beam are also shifted in the right direction in the drawing. Since the focused sub-beam spot is smaller in numerical number than the focused main beam spot, the amount of the displacement of the peak position of the focused sub-beam spot is smaller than the amount of the displacement of the peak position of the focused main beam spot, for which reason the amount of the phase shift of the sub-beam is smaller than the amount of the phase shift of the main beam. If the radial tilt appears on the optical disk, then the peak position of the focused sub-beam spot is left side of the peak positions of the focused main beam spot in the drawing, for which reason the phase of the track error signal of the sub-beam is left side of the phase of the track error signal of the main beam.

The track error signal of the main beam is used for the track servo. Firstly, it is considered that a track servo is applied to the land. If the radial tilt of the optical disk 7 is 0 degree, then as the track error signal of the main beam is 0, the track error signal of the sub-beam is also 0. If the radial tilt of the optical disk 7 is +0.5 degrees, then as the track error signal of the main beam is 0, the track error signal of the sub-beam takes a plus value. Secondly, it is considered that a track servo is applied to the groove. If the radial tilt of the optical disk 7 is 0 degree, then as the track error signal of the main beam is 0, the track error signal of the sub-beam is also 0. If the radial tilt of the optical disk 7 is +0.5 degrees, then as the track error signal of the main beam is 0, the track error signal of the sub-beam takes a minus value. Thirdly, it is considered that no track servo is applied as in the track access process. If the radial tilt of the optical disk 7 is 0 degree, then the main beam and the sub-beam are correspondent in the phase of the track error signal. If the radial tilt of the optical disk 7 is +0.5 degrees, then the phase of the track error signal of the sub-beam is positioned in the plus side of the phase of the track error signal of the main beam.

Figure 13A:
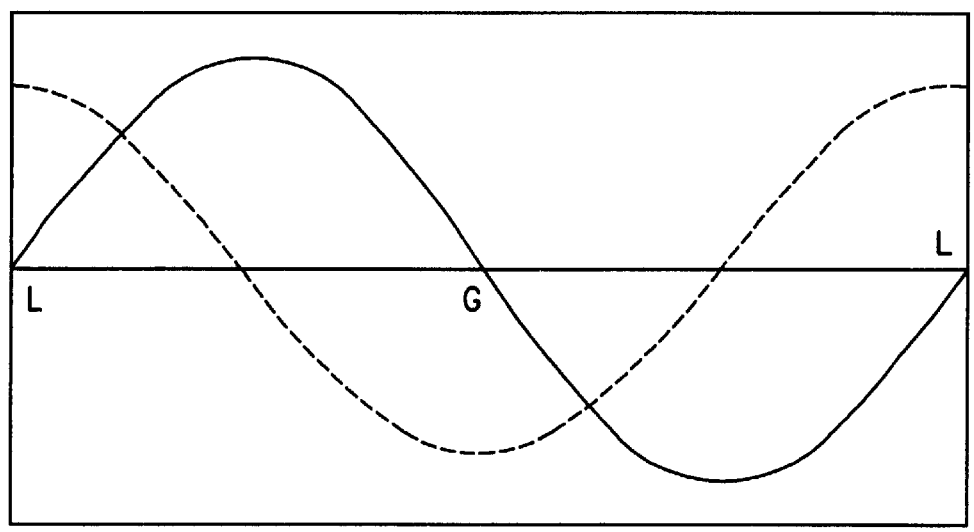
FIG. 13A is a diagram illustrative of calculated track error signals of a main beam when the focused main beam spot across the track of the optical disk in the radial direction in case of the tilt angles of 0 degree and −0.5 degrees, wherein the calculation of the track error signals is made in accordance with the push-pull method, and the real line represents the track error signal in case of the tilt angle of 0 degree, whilst the broken line represents the track error signal in case of the tilt angle of −0.5 degrees.
Figure 13B:
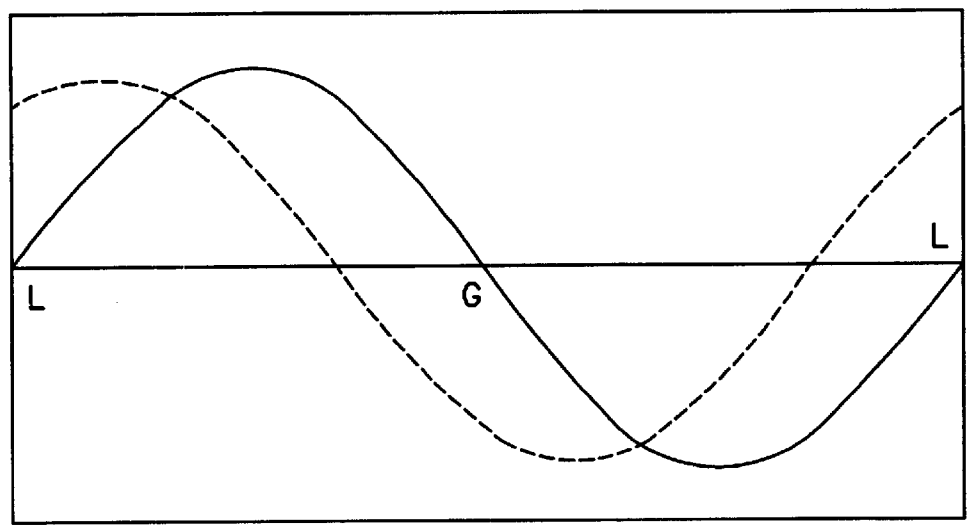
FIG. 13B is a diagram illustrative of calculated track error signals of a sub-beam when the focused sub-beam spot across the track of the optical disk in the radial direction in case of the tilt angles of 0 degree and −0.5 degrees, wherein the calculation of the track error signals is made in accordance with the push-pull method, and the real line represents the track error signal in case of the tilt angle of 0 degree, whilst the broken line represents the track error signal in case of the tilt angle of −0.5 degrees.

FIG. 13A is a diagram illustrative of calculated track error signals of a main beam when the focused main beam spot across the track of the optical disk in the radial direction in case of the tilt angles of 0 degree and −0.5 degrees, wherein the calculation of the track error signals is made in accordance with the push-pull method, and the real line represents the track error signal in case of the tilt angle of 0 degree, whilst the broken line represents the track error signal in case of the tilt angle of −0.5 degrees. FIG. 13B is a diagram illustrative of calculated track error signals of a sub-beam when the focused sub-beam spot across the track of the optical disk in the radial direction in case of the tilt angles of 0 degree and −0.5 degrees, wherein the calculation of the track error signals is made in accordance with the push-pull method, and the real line represents the track error signal in case of the tilt angle of 0 degree, whilst the broken line represents the track error signal in case of the tilt angle of −0.5 degrees. The calculations are made under the conditions that a light emitted from the semiconductor laser 1 has a wavelength of 660 nanometers, the numerical number of the main beam is 0.65, the numerical number of the sub-beam is 0.5, the optical disk has a substrate thickness of 0.6 millimeters, a track pitch of the optical disk is 0.5 micrometers, and a groove depth of the optical disk is 70 nanometers. In the drawings, illustrated signal waveform corresponds to the track error signals of one period of the groove. The character "L" represents the lands whilst the character "G" represents the groove. Namely, the position of the track error signal across 0-point from the minus side to the plus side corresponds to the land (L), whilst the position of the track error signal across 0-point from the plus side to the minus side corresponds to the land (G). The track error signal is normalized with the sum signal of the incident main beam and the incident sub-beam into the optical disk.

If the radial tile of the optical disk 7 is 0 degree, then the main beam and the sub-beam are correspondent in the peak position of the focused beam spot, for which reason the main beam and the sub-beam are correspondent in the phase of the track error signal. Since the focused sub-beam spot is larger in diameter than the focused main beam spot, the track error signal of the sub-beam is slightly smaller in amplitude than the track error signal of the main beam.

If he radial tile of the optical disk 7 is −0.5 degrees, then the peak positions of the focused sub-beam spot and the focused main beam spot are displaced in the left direction of the drawing, for which reason the phases of the track error signals of the main beam and the sub-beam are also shifted in the left direction in the drawing. Since the focused sub-beam spot is smaller in numerical number than the focused main beam spot, the amount of the displacement of the peak position of the focused sub-beam spot is smaller than the amount of the displacement of the peak position of the focused main beam spot, for which reason the amount of the phase shift of the sub-beam is smaller than the amount of the phase shift of the main beam. If the radial tilt appears on the optical disk, then the peak position of the focused sub-beam spot is right side of the peak positions of the focused main beam spot in the drawing, for which reason the phase of the track error signal of the sub-beam is right side of the phase of the track error signal of the main beam.

The track error signal of the main beam is used for the track servo. Firstly, it is considered that a track servo is applied to the land. If the radial tilt of the optical disk 7 is 0 degree, then as the track error signal of the main beam is 0, the track error signal of the sub-beam is also 0. If the radial tilt of the optical disk 7 is –0.5 degrees, then as the track error signal of the main beam is 0, the track error signal of the sub-beam takes a minus value. Secondly, it is considered that a track servo is applied to the groove. If the radial tilt of the optical disk 7 is 0 degree, then as the track error signal of the main beam is 0, the track error signal of the sub-beam is also 0. If the radial tilt of the optical disk 7 is –0.5 degrees, then as the track error signal of the main beam is 0, the track error signal of the sub-beam takes a plus value. Thirdly, it is considered that no track servo is applied as in the track access process. If the radial tilt of the optical disk 7 is 0 degree, then the main beam and the sub-beam are correspondent in the phase of the track error signal. If the radial tilt of the optical disk 7 is –0.5 degrees, then the phase of the track error signal of the sub-beam is positioned in the minus side of the phase of the track error signal of the main beam.

From FIGS. 12A, 12B, 13A and 13B, the followings can be understood. Firstly, it is considered that the track servo is applied to the land. If the radial tilts of the optical disk 7 are +0.5 degrees, 0 degree and –0.5 degrees respectively, then as the track error signal of the main beam is 0, the track error signals of the sub-beams take a plus value, 0 and a minus value respectively. This means that the track error signals of the sub-beams upon application of the track servo with the track error signal of the main beam is usable as the radial tilt signal. A signal obtained by subtracting the track error signal of the main beam from the track signal of the sub-beam is also usable as the radial tilt signal.

Secondly, it is considered that the track servo is applied to the groove. If the radial tilts of the optical disk 7 are +0.5 degrees, 0 degree and –0.5 degrees respectively, then as the track error signal of the main beam is 0, the track error signals of the sub-beams take a minus value, 0 and a plus value respectively. This means that the track error signals of the sub-beams upon application of the track servo with the track error signal of the main beam is usable as the radial tilt signal. A signal obtained by subtracting the track error signal of the main beam from the track signal of the sub-beam is also usable as the radial tilt signal.

Thirdly, it is considered that no track servo is applied. If the radial tilts of the optical disk 7 are +0.5 degrees, 0 degree and –0.5 degrees respectively, then as the track error signal of the main beam is 0, the differences in phase of the track error signal of the sub-beam from the track error signal of the main beam take a plus value, 0 and a minus value respectively. This means that a difference in phase of the track error signal of the sub-beam from the track error signal of the main beam is usable as the radial tilt signal.

Figure 14:
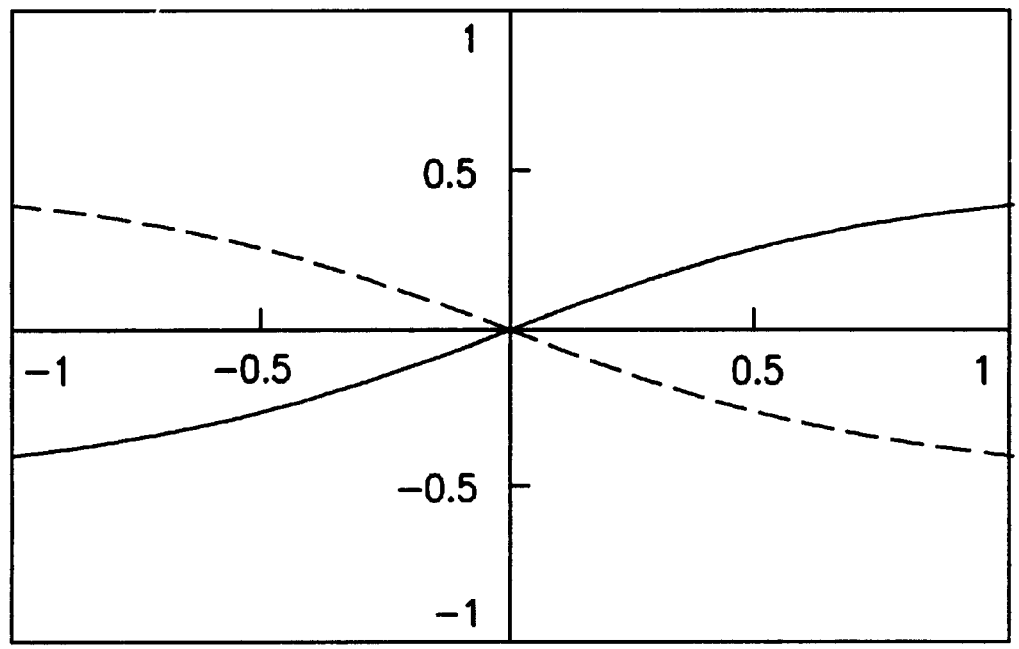
FIG. 14 is a diagram illustrative of a calculated radial tilt detecting characteristic, wherein the track error signal of the sub-beam is used as the radial tilt signal upon application of the track servo to the land and the groove with the track error signal of the main beam.

FIG. 14 is a diagram illustrative of a calculated radial tilt detecting characteristic, wherein the track error signal of the sub-beam is used as the radial tilt signal upon application of the track servo to the land and the groove with the track error signal of the main beam. A real line represents a radial tilt signal obtained when a track servo is applied to a land of the optical disk with the track error signal of the main beam, whilst a broken line represents a radial tilt signal obtained when a track servo is applied to a groove of the optical disk with the track error signal of the main beam. A horizontal axis represents the radial tilt, whilst the vertical axis represents the radial tilt signal as the track error signal of the sub-beam normalized with the sum signal of the track error signal of the main beam. The calculation is made under the same conditions as described with reference to FIGS. 12A, 12B, 13A and 13B. If the track servo is applied to the land and if the radial tilts of the optical disk take a plus value, 0 and a minus value respectively, then the radial tilt signals take a plus value, 0 and a minus value respectively. If the track servo is applied to the groove and if the radial tilts of the optical disk take a plus value, 0 and a minus value respectively, then the radial tilt signals take a plus value, 0 and a minus value respectively. If the track servo is applied to both the land and the groove, then the increase in the absolute value of the radial tilt increases the absolute value of the radial tilt signal.

The sensitivity of the detection of the radial tilt is given by an absolute value of a gradient of the radial tilt signals in the vicinity of the origin in the drawing. In FIG. 14, the absolute value of the gradient of the radial tilt signals in the vicinity of the origin is about 0.4 per degree. This value is relatively high as the detection sensitivity. The radial tilt signal is obtained from the difference in phase of the track signal of the sub-beam from the track signal of the main beam, wherein the phase difference between the main beam rack signal and the sub-beam track signal is large, for which reason it is possible to realize a highly sensitive detection of the radial tilt.

Figure 15:
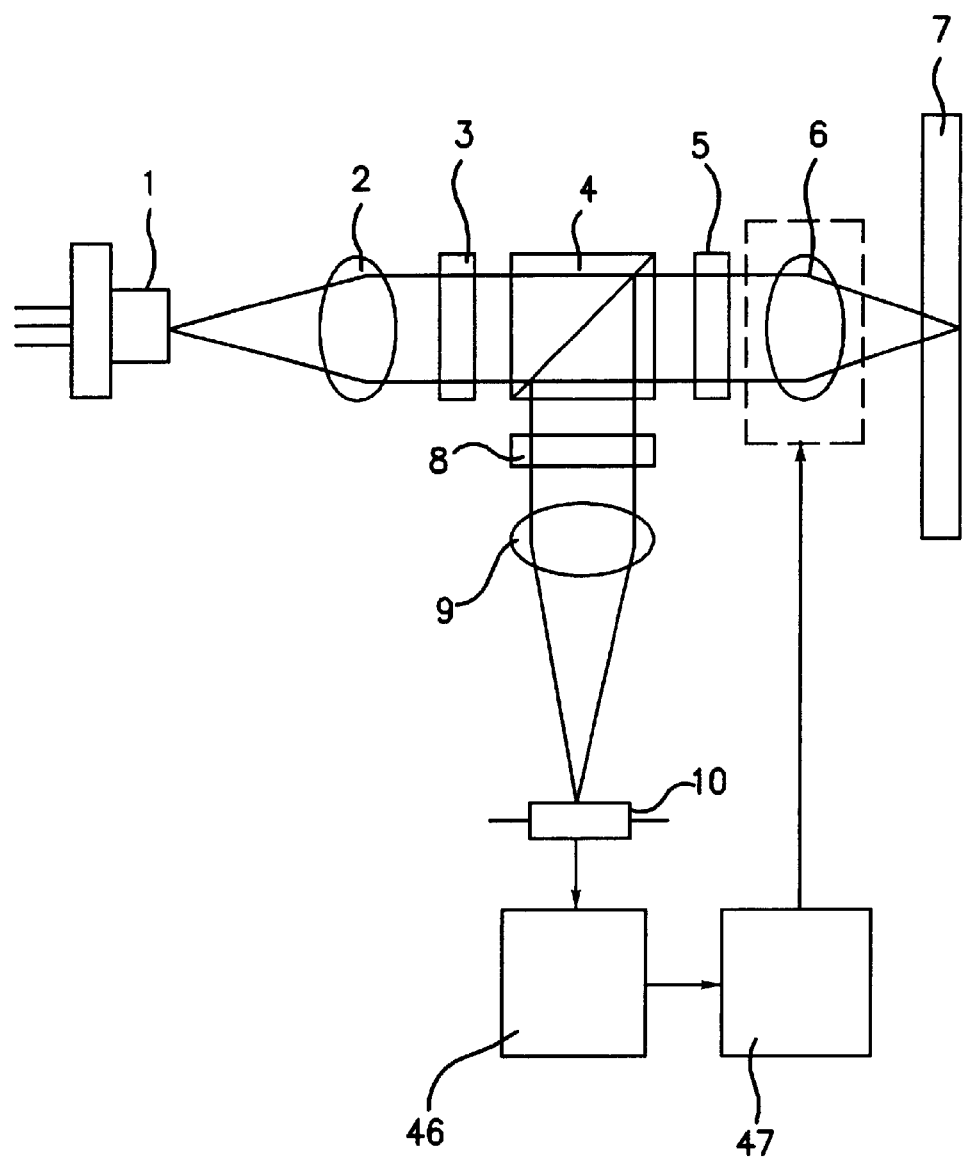
FIG. 15 is a schematic view illustrative of a first novel optical information receding/reproducing device having the first novel optical head which is capable of detecting the radial tilt of the optical recording medium in one preferred embodiment according to the present invention.

FIG. 15 is a schematic view illustrative of a first novel optical information receding/reproducing device having the first novel optical head which is capable of detecting the radial tilt of the optical recording medium in one preferred embodiment according to the present invention. The first novel optical information receding/reproducing device has an optical head as well as an arithmetic circuit 46 and a driver circuit 47. The first novel optical head has a semiconductor laser 1, a collimator lens 2, a diffraction optical device 3, a polarization beam splitter 4, a quarter-wavelength plate 5, an objective lens 6, an optical disk 7, a hologram optical device 8, an additional lens 9 and a photo-detector 10. A laser beam is emitted from the semiconductor laser 1, and transmitted through the collimator lens 2 where the laser beam is collimated. The collimated laser beam is then transmitted through the diffraction optical device 3, where the collimated laser beam is divided into three parts, for example, 0-order light, +1-order diffracted light, and –1-order diffracted light. The divided three lights reach the polarization beam splitter 4 in a P-polarization direction, wherein almost 100% of the divided three lights pass through the polarization beam splitter 4 and then are transmitted through the quarter-wavelength plate 5, wherein the three lights are converted from the liner polarization to the circular polarization. The circular-polarized three lights are then transmitted through the objective lens 6, wherein the lights are focused onto the optical disk 7. The lights are then reflected from the optical disk 7 and further transmitted through the objective lens 6 to reach the quarter-wavelength plate 5, wherein the lights are converted from the circular polarization to the liner polarization but in an S-polarization direction perpendicular to the P-polarization direction. The S-polarized lights reach the polarization beam splitter 4, wherein almost 100% of the S-polarized three lights are reflected by the polarization beam splitter 4. The three lights are then transmitted through the hologram optical device 8, wherein the lights are subjected to the diffraction of most of the +1-order diffracted light. The three lights are the transmitted through the additional lens 9 to reach the photo-detector 10. The arithmetic circuit 46 is connected to the photo-detector 10 for receiving an output from the photo-detector 10 and calculating a radial tilt signal from the difference in phase of the track signal of the sub-beam from the track signal of the main beam. The driver circuit 47 is connected to the arithmetic circuit 46 for receiving the calculated radial tilt signal from the arithmetic circuit 46. The driver circuit 47 is also connected to an actuator not illustrated for tilting the objective lens in the radial direction so that the radial tilt signal from the arithmetic circuit 46 becomes 0. As a result, the radial tilt of the optical disk 7 is completely compensated. The actuator may be realized by the already known structure disclosed in ISOM/ODS'99 technical digest pp. 20–22.

The signs of radial title signals depends upon the cases of if the track error signal of the sub-beam is used as the radial tilt signal upon application of the track servo with the track error signal of the main beam, and if a signal obtained by subtracting the track error signal of the main beam from the track error signal of the sub-beam is used as the radial tilt signal, and if the track servo is applied to the land and if the track servo is applied to the groove. The arithmetic circuit 46 and the driver circuit 47 are different in polarization of the circuits between if the track servo is applied to the land and if the track servo is applied to the groove.

Figure 16:
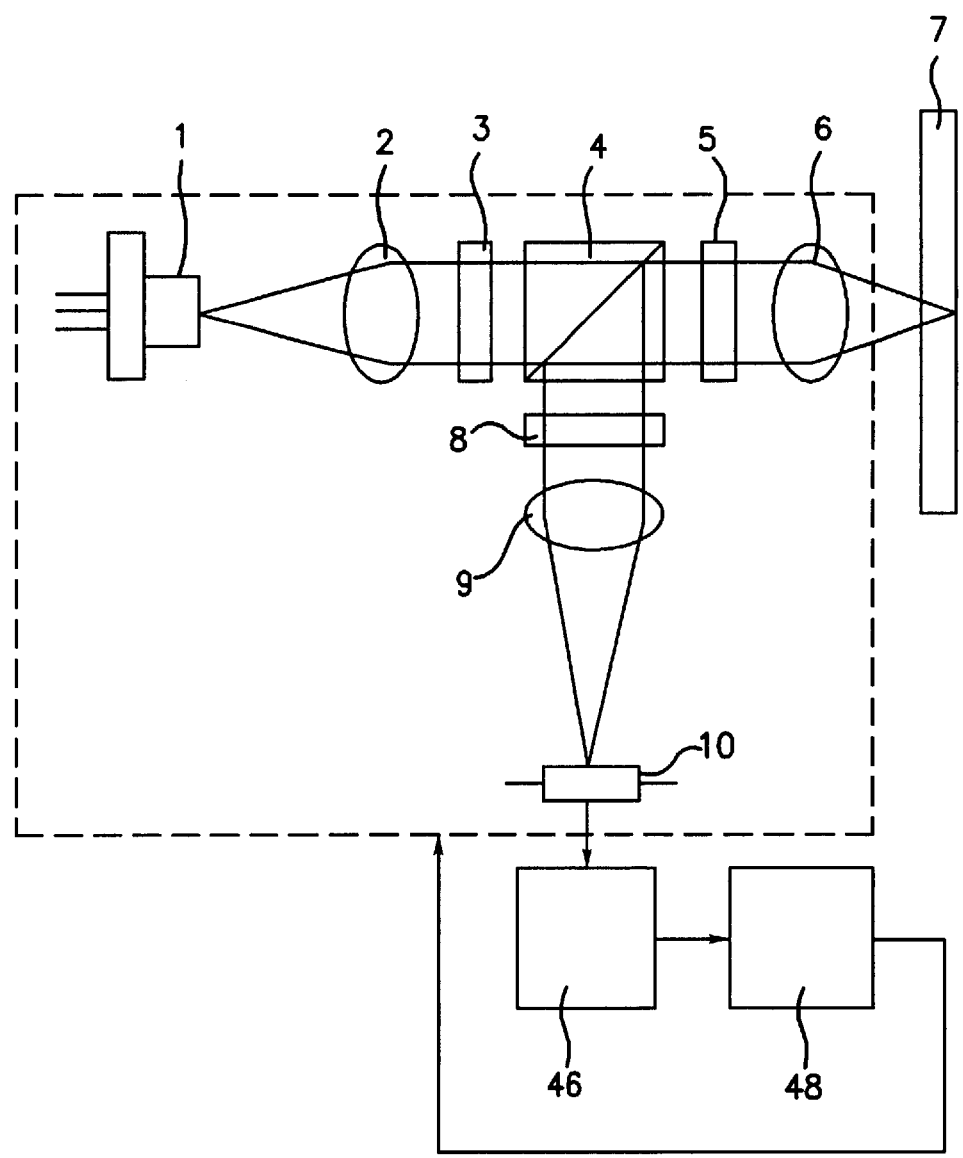
FIG. 16 is a schematic view illustrative of a second novel optical information receding/reproducing device having the first novel optical head which is capable of detecting the radial tilt of the optical recording medium in one preferred embodiment according to the present invention.

FIG. 16 is a schematic view illustrative of a second novel optical information receding/reproducing device having the first novel optical head which is capable of detecting the radial tilt of the optical recording medium in one preferred embodiment according to the present invention. The second novel optical information receding/reproducing device has an optical head as well as an arithmetic circuit 46 and a driver circuit 48. The first novel optical head has a semiconductor laser 1, a collimator lens 2, a diffraction optical device 3, a polarization beam splitter 4, a quarter-wavelength plate 5, an objective lens 6, an optical disk 7, a hologram optical device 8, an additional lens 9 and a photo-detector 10. A laser beam is emitted from the semiconductor laser 1, and transmitted through the collimator lens 2 where the laser beam is collimated. The collimated laser beam is then transmitted through the diffraction optical device 3, where the collimated laser beam is divided into three parts, for example, 0-order light, +1-order diffracted light, and −1-order diffracted light. The divided three lights reach the polarization beam splitter 4 in a P-polarization direction, wherein almost 100% of the divided three lights pass through the polarization beam splitter 4 and then are transmitted through the quarter-wavelength plate 5, wherein the three lights are converted from the liner polarization to the circular polarization. The circular-polarized three lights are then transmitted through the objective lens 6, wherein the lights are focused onto the optical disk 7. The lights are then reflected from the optical disk 7 and further transmitted through the objective lens 6 to reach the quarter-wavelength plate 5, wherein the lights are converted from the circular polarization to the liner polarization but in an S-polarization direction perpendicular to the P-polarization direction. The S-polarized lights reach the polarization beam splitter 4, wherein almost 100% of the S-polarized three lights are reflected by the polarization beam splitter 4. The three lights are then transmitted through the hologram optical device 8, wherein the lights are subjected to the diffraction of most of the +1-order diffracted light. The three lights are the transmitted through the additional lens 9 to reach the photo-detector 10. The arithmetic circuit 46 is connected to the photo-detector 10 for receiving an output from the photo-detector 10 and calculating a radial tilt signal from the difference in phase of the track signal of the sub-beam from the track signal of the main beam. The driver circuit 48 is connected to the arithmetic circuit 46 for receiving the calculated radial tilt signal from the arithmetic circuit 46. The driver circuit 48 is also connected to an actuator not illustrated for tilting the optical head in the radial direction so that the radial tilt signal from the arithmetic circuit 46 becomes 0. As a result, the radial tilt of the optical disk 7 is completely compensated. The actuator may be realized by the already known structure disclosed in Japanese laid-open patent publication No. 9-161293.

The signs of radial title signals depends upon the cases of if the track error signal of the sub-beam is used as the radial tilt signal upon application of the track servo with the track error signal of the main beam, and if a signal obtained by subtracting the track error signal of the main beam from the track error signal of the sub-beam is used as the radial tilt signal, and if the track servo is applied to the land and if the track servo is applied to the groove. The arithmetic circuit 46 and the driver circuit 48 are different in polarization of the circuits between if the track servo is applied to the land and if the track servo is applied to the groove.

As a modification to the above first and second optical information recording/reproducing devices, it is also possible that a liquid crystal optical device is provided on an optical path in the optical system of the optical head for compensation to the radial tilt of the optical disk 7. A control voltage is applied to the liquid crystal optical device to generate a new frame aberration which cancels the frame aberration due to a substrate of the optical disk 7 for compensation to the radial tilt of the optical disk 7. This liquid crystal optical device may have the known structure as disclosed in ISOM/ODS '96 Technical Digest pp. 315–353.

Figure 17:
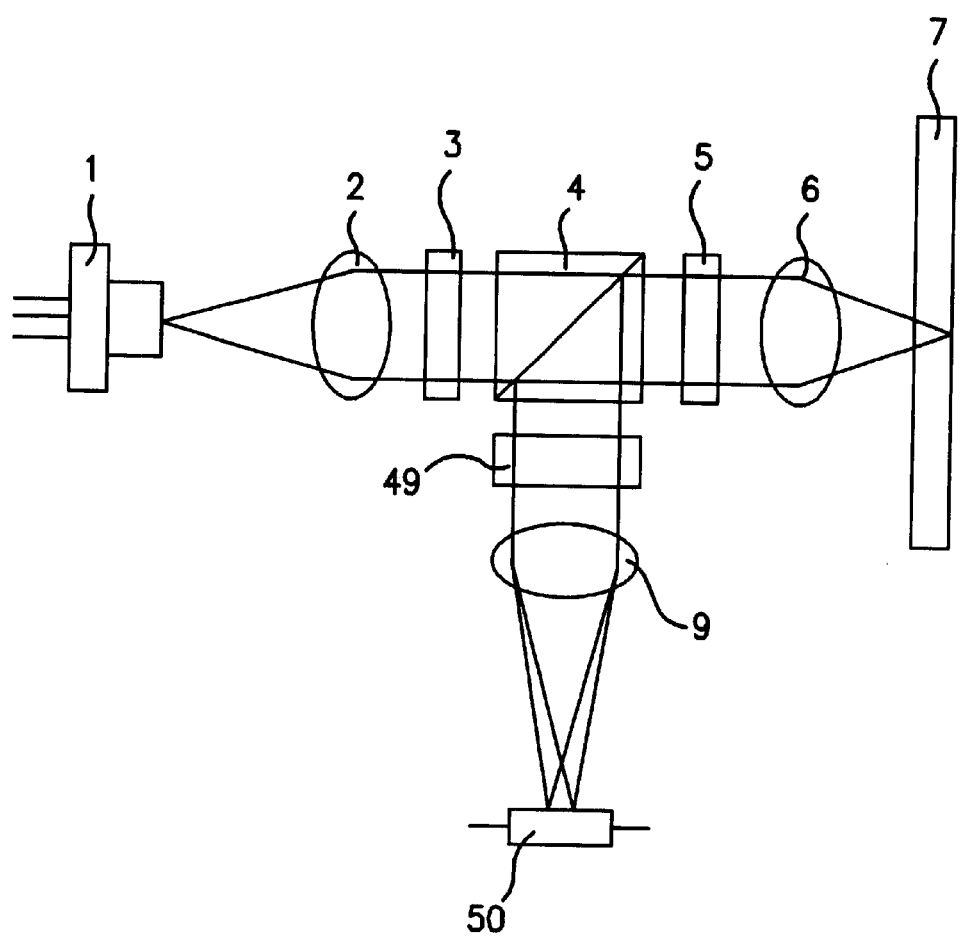
FIG. 17 is a schematic view illustrative of a second novel optical head which is capable of detecting the radial tilt of the optical recording medium in one preferred embodiment according to the present invention.

FIG. 17 is a schematic view illustrative of a second novel optical head which is capable of detecting the radial tilt of the optical recording medium in one preferred embodiment according to the present invention. The second novel optical head has a semiconductor laser 1, a collimator lens 2, a diffraction optical device 3, a polarization beam splitter 4, a quarter-wavelength plate 5, an objective lens 6, an optical disk 7, a cylinder lens 49, an additional lens 9 and a photo-detector 50. A laser beam is emitted from the semiconductor laser 1, and transmitted through the collimator lens 2 where the laser beam is collimated. The collimated laser beam is then transmitted through the diffraction optical device 3, where the collimated laser beam is divided into three parts, for example, 0-order light, +1-order diffracted light, and −1-order diffracted light. The divided three lights reach the polarization beam splitter 4 in a P-polarization direction, wherein almost 100% of the divided three lights pass through the polarization beam splitter 4 and then are transmitted through the quarter-wavelength plate 5, wherein the three lights are converted from the liner polarization to the circular polarization. The circular-polarized three lights are then transmitted through the objective lens 6, wherein the lights are focused onto the optical disk 7. The lights are then reflected from the optical disk 7 and further transmitted through the objective lens 6 to reach the quarter-wavelength plate 5, wherein the lights are converted from the circular polarization to the liner polarization but in an S-polarization direction perpendicular to the P-polarization direction. The S-polarized lights reach the polarization beam splitter 4, wherein almost 100% of the S-polarized three lights are reflected by the polarization beam splitter 4. The three lights are then transmitted through the cylinder lens 49, wherein the lights are subjected to the diffraction of most of the +1-order diffracted light. The three lights are the transmitted through the additional lens 9 to reach the photo-detector 50. The photo-detector 50 is positioned at an intermediate point between focal points of the cylinder lens 49 and the additional lens 9.

The diffraction optical device 3 has the same structure as illustrated in FIG. 6. Namely, the diffraction optical device 3 has a circular-shaped region 11 which is encompassed by a broken line which corresponds to a circumference of the objective lens 6, wherein the circular-shaped region 11 has a smaller diameter than the objective lens 6. A diffraction grating is selectively formed only in the circular-shaped region 11. The grating direction of the diffraction grating is parallel to the radial direction of the optical disk 7. The diffraction grating has a grating pattern which has a constant pitch alignment of plural straight line segments which are parallel to the radial direction perpendicular top the tangential direction. The diffraction grating comprises the alternating alignments of the line segments and space regions. If a difference in phase between the line segments and space regions of the diffraction grating is, for example, $0.232\pi$, then about 87.3% of the light incident into the circular-shaped region 11 is transmitted through the diffraction optical device 3, whilst about 5.1% of the incident light is diffracted to become the +1-order diffracted light and further about 5.1% of the incident light is diffracted to become the −1-order diffracted light. The light incident into the outside region of the circular-shaped region 11 is transmitted through the diffraction optical device 3 at almost 100%. The main beam comprises not only the about 87.3% of the light incident into the circular-shaped region 11 and the light incident into the outside region of the circular-shaped region 11, for which reason the numerical number to the main beam depends upon the effective diameter of the objective lens 6. The sub-beam includes only the +1-order diffracted light and the −1-order diffracted light, for which reason the numerical number to the sub-beam depends upon the effective diameter of the circular-shaped region 11. As a result, the main beam and the sub-beam are different in intensity distribution from each other upon incidence into the objective lens 6.

The arrangement of beam spots and the alignment of tracks of the optical disk of the first novel optical head are as illustrated in FIG. 7. First, second and third beam spots 13, 14, and 15 correspond to the non-diffracted light, the +1-order diffracted light and the −1-order diffracted light, respectively. The first, second and third beam spots 13, 14, and 15 are aligned on a single track 12. Each of the tracks 12 has a single alignment of lands and grooves, wherein the lands correspond to the valley portions of the pits and the grooves correspond to the ridged portions. Both the lands and the grooves are used as the track. The second and third beam spots 14 and 15 as the sub-beams are larger in diameter than the first beam spot 13 as the main beam because the sub-beam is smaller in numerical number than the main beam.

Figure 18:
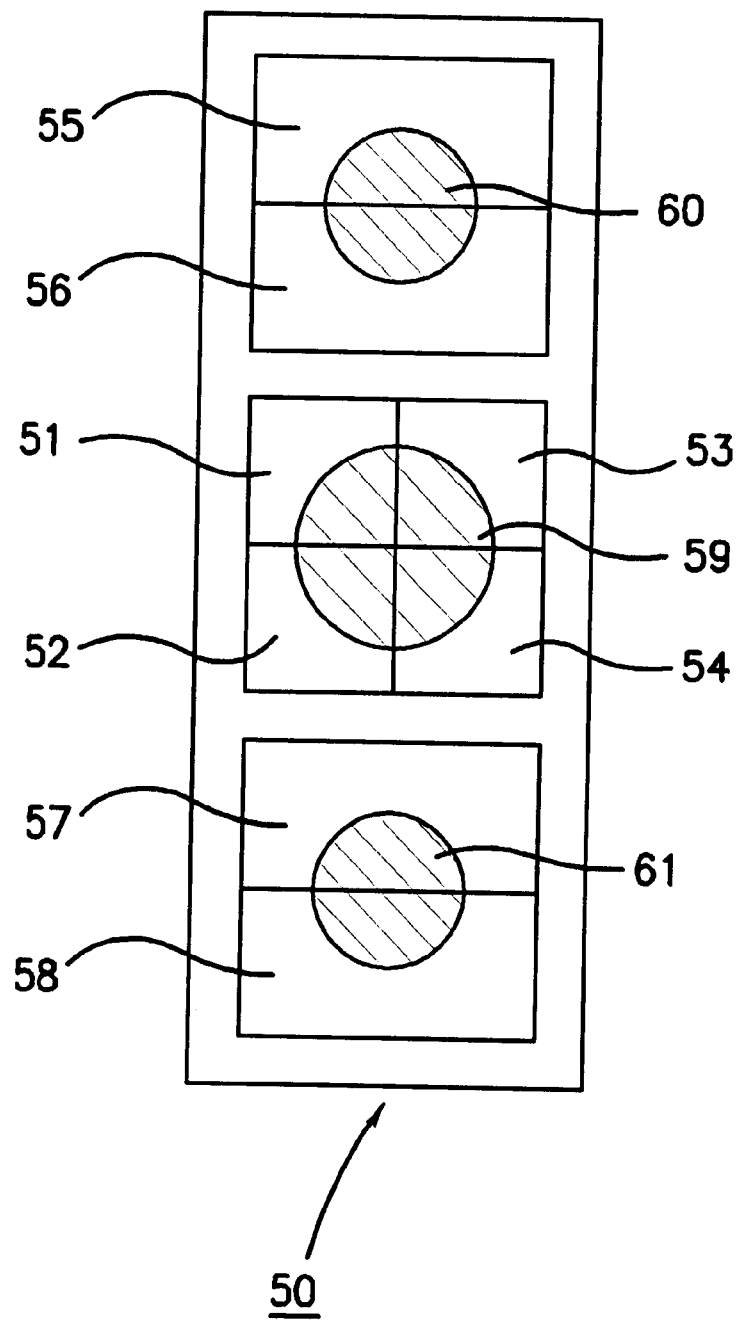
FIG. 18 is a plane view illustrative of the arrangement of the beam spots and the alignment of the photo-receiving regions of the photo-detector of the second novel optical head shown in FIG. 17.

FIG. 18 is a plane view illustrative of the arrangement of the beam spots and the alignment of the photo-receiving regions of the photo-detector of the second novel optical head shown in FIG. 17. First, second and third beam spots 59, 60 and 61 correspond to the non-diffracted light, the +1-order diffracted light and the −1-order diffracted light, respectively. The first beam spot 59 is received by four-divided photo-receiving areas 51, 52, 53 and 54 which are bounded by both a first dividing line crossing the optical axis and being parallel to the tangential line of the optical disk 7, and a second dividing line crossing the optical axis and being parallel to the radial direction. The second beam spot 60 is received by two-divided photo-receiving areas 55 and 56 which are bounded by a single dividing line crossing the optical axis and being parallel to the radial direction. The third beam spot 61 is received by two-divided photo-receiving areas 57 and 58 which are bounded by a single dividing line crossing the optical axis and being parallel to the radial direction. The alignment of the first, second and third beam spots 59, 60 and 61 on the optical disk are parallel to the tangential direction. The alignment of the first, second and third beam spots 59, 60 and 61 on the photo-detector 50 are parallel to the radial direction perpendicular to the tangential direction due to the functions of the cylinder lens 49 and the additional lens 9. The second and third beam spots 60 and 61 as the sub-beam spots are smaller in diameter than the first beam spot 59 as the main beam spot because the sub-beam spots are smaller in numerical number than the main beam spot.

Outputs from the photo-receiving areas 51 through 58 are represented by V51 to V58. Focus error signals are obtained by an astigmatism method, wherein an operation (V51+V54)−(V52+V53) is made. Track error signals are obtained from the focused main beam spot by a push-pull method, wherein an operation (V51+V53)−(V52+V54) is made. A reproducing signal from the beam spot 131 is obtained by an operation (V51+V52+V53+V54). Track error signals are obtained from the focused sub-beam spot by a push-pull method, wherein an operation (V55+V57)−(V56+V58) is made.

The above described methods of how to obtain the radial tilt can be applied to this second optical head. If the radial tilt of the optical disk is 0 degree, then the main beam and the sub-beam are correspondent to each other in the peak position of the focused beam spot. The focused sub-beam spot is larger in diameter than the focused main beam spot because the focused sub-beam spot is smaller in numerical number than the focused main beam spot.

If the radial tilt of the optical disk is +0.5 degrees, then the peak positions of the focused main beam spot and the focused sub-beam spot are displaced in a right direction in the drawing. Since the focused sub-beam spot is smaller in numerical number than the focused main beam spot, the amount of the displacement of the peak position of the focused sub-beam spot is smaller than the amount of the displacement of the peak position of the focused main beam spot. If the radial tilt appears on the optical disk, then the peak position of the focused sub-beam spot is left side of the peak positions of the focused main beam spot in the drawing. Side lobes appear on the right side of both the focused main beam spot and the focused sub-beam spot. Since the focused sub-beam spot is smaller in numerical number than the focused main beam spot, then the side lobe of the focused sub-beam spot is smaller in height than the side lobe of the focused main beam spot.

If the radial tilt of the optical disk is 0 degree, then the main beam and the sub-beam are correspondent to each other in the peak position of the focused beam spot. The focused sub-beam spot is larger in diameter than the focused main beam spot because the focused sub-beam spot is smaller in numerical number than the focused main beam spot.

If the radial tilt of the optical disk is −0.5 degrees, then the peak positions of the focused main beam spot and the focused sub-beam spot are displaced in a left direction in the drawing. Since the focused sub-beam spot is smaller in numerical number than the focused main beam spot, the amount of the displacement of the peak position of the focused sub-beam spot is smaller than the amount of the displacement of the peak position of the focused main beam spot. If the radial tilt appears on the optical disk, then the peak position of the focused sub-beam spot is right side of the peak positions of the focused main beam spot in the drawing. Side lobes appear on the left side of both the focused main beam spot and the focused sub-beam spot. Since the focused sub-beam spot is smaller in numerical number than the focused main beam spot, then the side lobe of the focused sub-beam spot is smaller in height than the side lobe of the focused main beam spot.

If the radial tile of the optical disk 7 is 0 degree, then the main beam and the sub-beam are correspondent in the peak position of the focused beam spot, for which reason the main beam and the sub-beam are correspondent in the phase of the track error signal. Since the focused sub-beam spot is larger in diameter than the focused main beam spot, the track error signal of the sub-beam is slightly smaller in amplitude than the track error signal of the main beam.

If he radial tile of the optical disk 7 is +0.5 degrees, then the peak positions of the focused sub-beam spot and the focused main beam spot are displaced in the right direction of the drawing, for which reason the phases of the track error signals of the main beam and the sub-beam are also shifted in the right direction in the drawing. Since the focused sub-beam spot is smaller in numerical number than the focused main beam spot, the amount of the displacement of the peak position of the focused sub-beam spot is smaller than the amount of the displacement of the peak position of the focused main beam spot, for which reason the amount of the phase shift of the sub-beam is smaller than the amount of the phase shift of the main beam. If the radial tilt appears on the optical disk, then the peak position of the focused sub-beam spot is left side of the peak positions of the focused main beam spot in the drawing, for which reason the phase of the track error signal of the sub-beam is left side of the phase of the track error signal of the main beam.

The track error signal of the main beam is used for the track servo. Firstly, it is considered that a track servo is applied to the land. If the radial tilt of the optical disk 7 is 0 degree, then as the track error signal of the main beam is 0, the track error signal of the sub-beam is also 0. If the radial tilt of the optical disk 7 is +0.5 degrees, then as the track error signal of the main beam is 0, the track error signal of the sub-beam takes a plus value. Secondly, it is considered that a track servo is applied to the groove. If the radial tilt of the optical disk 7 is 0 degree, then as the track error signal of the main beam is 0, the track error signal of the sub-beam is also 0. If the radial tilt of the optical disk 7 is +0.5 degrees, then as the track error signal of the main beam is 0, the track error signal of the sub-beam takes a minus value. Thirdly, it is considered that no track servo is applied as in the track access process. If the radial tilt of the optical disk 7 is 0 degree, then the main beam and the sub-beam are correspondent in the phase of the track error signal. If the radial tilt of the optical disk 7 is +0.5 degrees, then the phase of the track error signal of the sub-beam is positioned in the plus side of the phase of the track error signal of the main beam.

If the radial tile of the optical disk 7 is 0 degree, then the main beam and the sub-beam are correspondent in the peak position of the focused beam spot, for which reason the main beam and the sub-beam are correspondent in the phase of the track error signal. Since the focused sub-beam spot is larger in diameter than the focused main beam spot, the track error signal of the sub-beam is slightly smaller in amplitude than the track error signal of the main beam.

If he radial tile of the optical disk 7 is −0.5 degrees, then the peak positions of the focused sub-beam spot and the focused main beam spot are displaced in the left direction of the drawing, for which reason the phases of the track error signals of the main beam and the sub-beam are also shifted in the left direction in the drawing. Since the focused sub-beam spot is smaller in numerical number than the focused main beam spot, the amount of the displacement of the peak position of the focused sub-beam spot is smaller than the amount of the displacement of the peak position of the focused main beam spot, for which reason the amount of the phase shift of the sub-beam is smaller than the amount of the phase shift of the main beam. If the radial tilt appears on the optical disk, then the peak position of the focused sub-beam spot is right side of the peak positions of the focused main beam spot in the drawing, for which reason the phase of the track error signal of the sub-beam is right side of the phase of the track error signal of the main beam.

The track error signal of the main beam is used for the track servo. Firstly, it is considered that a track servo is applied to the land. If the radial tilt of the optical disk 7 is 0 degree, then as the track error signal of the main beam is 0, the track error signal of the sub-beam is also 0. If the radial tilt of the optical disk 7 is −0.5 degrees, then as the track error signal of the main beam is 0, the track error signal of the sub-beam takes a minus value. Secondly, it is considered that a track servo is applied to the groove. If the radial tilt of the optical disk 7 is 0 degree, then as the track error signal of the main beam is 0, the track error signal of the sub-beam is also 0. If the radial tilt of the optical disk 7 is −0.5 degrees, then as the track error signal of the main beam is 0, the track error signal of the sub-beam takes a plus value. Thirdly, it is considered that no track servo is applied as in the track access process. If the radial tilt of the optical disk 7 is 0 degree, then the main beam and the sub-beam are correspondent in the phase of the track error signal. If the radial tilt of the optical disk 7 is −0.5 degrees, then the phase of the track error signal of the sub-beam is positioned in the minus side of the phase of the track error signal of the main beam.

Firstly, it is considered that the track servo is applied to the land. If the radial tilts of the optical disk 7 are +0.5 degrees, 0 degree and −0.5 degrees respectively, then as the track error signal of the main beam is 0, the track error signals of the sub-beams take a plus value, 0 and a minus value respectively. This means that the track error signals of the sub-beams upon application of the track servo with the track error signal of the main beam is usable as the radial tilt signal. A signal obtained by subtracting the track error signal of the main beam from the track signal of the sub-beam is also usable as the radial tilt signal.

Secondly, it is considered that the track servo is applied to the groove. If the radial tilts of the optical disk 7 are +0.5 degrees, 0 degree and −0.5 degrees respectively, then as the track error signal of the main beam is 0, the track error signals of the sub-beams take a minus value, 0 and a plus value respectively. This means that the track error signals of the sub-beams upon application of the track servo with the track error signal of the main beam is usable as the radial tilt signal. A signal obtained by subtracting the track error signal of the main beam from the track signal of the sub-beam is also usable as the radial tilt signal.

Thirdly, it is considered that no track servo is applied. If the radial tilts of the optical disk 7 are +0.5 degrees, 0 degree and −0.5 degrees respectively, then as the track error signal of the main beam is 0, the differences in phase of the track error signal of the sub-beam from the track error signal of the main beam take a plus value, 0 and a minus value respectively. This means that a difference in phase of the track error signal of the sub-beam from the track error signal of the main beam is usable as the radial tilt signal.

If the track servo is applied to the land and if the radial tilts of the optical disk take a plus value, 0 and a minus value respectively, then the radial tilt signals take a plus value, 0 and a minus value respectively. If the track servo is applied to the groove and if the radial tilts of the optical disk take a plus value, 0 and a minus value respectively, then the radial tilt signals take a plus value, 0 and a minus value respectively. If the track servo is applied to both the land and the groove, then the increase in the absolute value of the radial tilt increases the absolute value of the radial tilt signal.

The sensitivity of the detection of the radial tilt is given by an absolute value of a gradient of the radial tilt signals in the vicinity of the origin in the drawing. The absolute value of the gradient of the radial tilt signals in the vicinity of the origin is about 0.4 per degree. This value is relatively high as the detection sensitivity. The radial tilt signal is obtained from the difference in phase of the track signal of the sub-beam from the track signal of the main beam, wherein the phase difference between the main beam rack signal and the sub-beam track signal is large, for which reason it is possible to realize a highly sensitive detection of the radial tilt.

Figure 19:
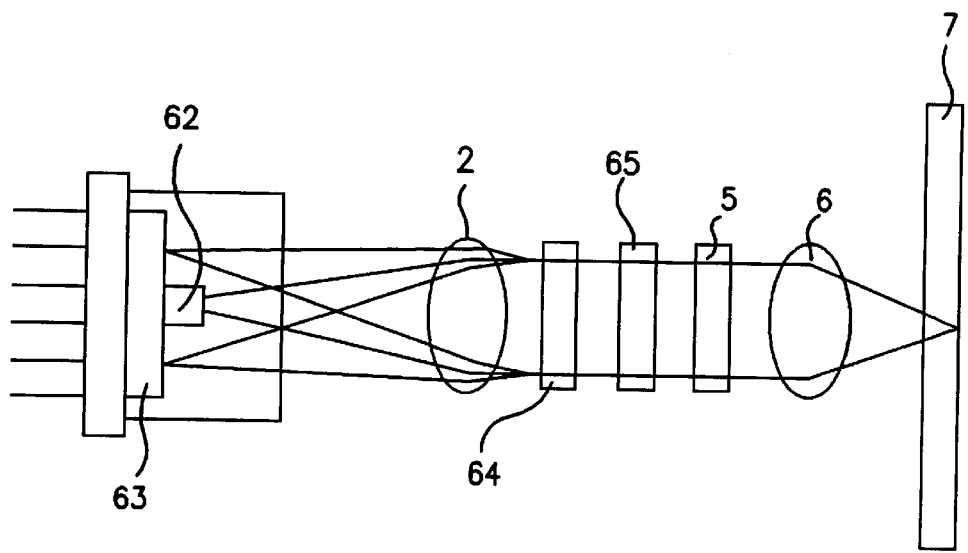
FIG. 19 is a schematic view illustrative of a third novel optical head which is capable of detecting the radial tilt of the optical recording medium in one preferred embodiment according to the present invention.

FIG. 19 is a schematic view illustrative of a third novel optical head which is capable of detecting the radial tilt of the optical recording medium in one preferred embodiment according to the present invention. The third novel optical head has a semiconductor laser 62, a collimator lens 2, a polarization diffraction optical device 64, a polarization hologram optical device 65, a quarter-wavelength plate 5, an objective lens 6, an optical disk 7, and a photo-detector 63. A laser beam is emitted from the semiconductor laser 1, and transmitted through the collimator lens 2 where the laser beam is collimated. The collimated laser beam is then transmitted through the polarization diffraction optical device 64, where the collimated laser beam is divided into three parts, for example, 0-order light, +1-order diffracted light, and −1-order diffracted light. The divided three lights as ordinary reach the polarization hologram optical device 65, wherein almost 100% of the divided three lights pass through the polarization hologram optical device 65 and then are transmitted through the quarter-wavelength plate 5, wherein the three lights are converted from the liner polarization to the circular polarization. The circular-polarized three lights are then transmitted through the objective lens 6, wherein the lights are focused onto the optical disk 7. The lights are then reflected from the optical disk 7 and further transmitted through the objective lens 6 to reach the quarter-wavelength plate 5, wherein the lights are converted from the circular polarization to the liner polarization but in an S-polarization direction perpendicular to the P-polarization direction. The S-polarized lights reach as extraordinary reach the polarization hologram optical device 65, wherein the most of incident lights are +1-order-diffracted. The lights are then incident into the polarization diffraction optical device 64 as the ordinary light and almost 100% of the lights pass through the polarization diffraction optical device 64. The three lights are then transmitted through the collimator lens 2 where the laser beam is collimated. The collimated lights reach the photo-detector 63.

The polarization diffraction optical device 64 has the same structure as the diffraction optical device 3 shown in FIG. 6. The polarization diffraction optical device 64 may have a grating which comprises two layers of a proton exchange region and a dielectric film over a lithium niobate substrate. The depth of the proton exchange region and a thickness of the dielectric film are properly decided so that the phase difference between the line parts and the space parts of the grating may be defined for the ordinary light and the extraordinary light independently. For the extraordinary lights traveling toward the optical disk 7, the phase difference between the line parts and the space parts of the grating is, for example, set at $0.232\pi$, then about 87% of the 0-order non-diffracted light incident into the circular-shaped grating region 11 passes through the polarization diffraction optical device 64, about 5.1% of the +1-order diffracted light incident into the circular-shaped grating region 11 passes through the polarization diffraction optical device 64, and about 5.1% of the −1-order diffracted light incident into the circular-shaped grating region 11 passes through the polarization diffraction optical device 64. The lights incident into the outside region of the circular-shaped grating region 11 passes through the polarization diffraction optical device 64 at almost 100%. For the ordinary lights traveling toward the photo-detector 63, the phase difference between the line parts and the space parts of the grating is, for example, set at 0, then both the lights incident into the circular-shaped grating region 11 and the outside region of the circular-shaped grating region 11 pass through the polarization diffraction optical device 64 at almost 100%.

The arrangement of the beam spots on the optical disk 7 are the same as shown in FIG. 7. The structure of the polarization hologram optical device 65 is the same as shown in FIG. 8. The polarization hologram optical device 65 has a double layered structure of the proton exchange region and the dielectric film over the lithium niobate substrate having the double refractivity. The cross sectional shape of the grating of each of the first, second, third and fourth type regions 16, 17, 18 and 19 is a double layer saw-tooth shape. The depth of the proton exchange region and the thickness of the dielectric film are properly designed so that the phase difference between the top and bottom portions of the saw-tooth shape rating may be defined independently to the ordinary light and the extraordinary light. For the ordinary light traveling toward the optical disk, the phase difference between the top and bottom parts of the saw-tooth grating is set at 0, then almost 100% of the lights incident into the first, second, third and fourth type regions 16, 17, 18 and 19 pass through the polarization hologram optical device 65. For the extraordinary light traveling toward the photo-detector 63, the phase difference between the top and bottom parts of the saw-tooth grating is set at $2\pi$, then almost 100% of the incident lights into the first, second, third and fourth type regions 16, 17, 18 and 19 are diffracted as the +1-order diffraction.

Figure 20:
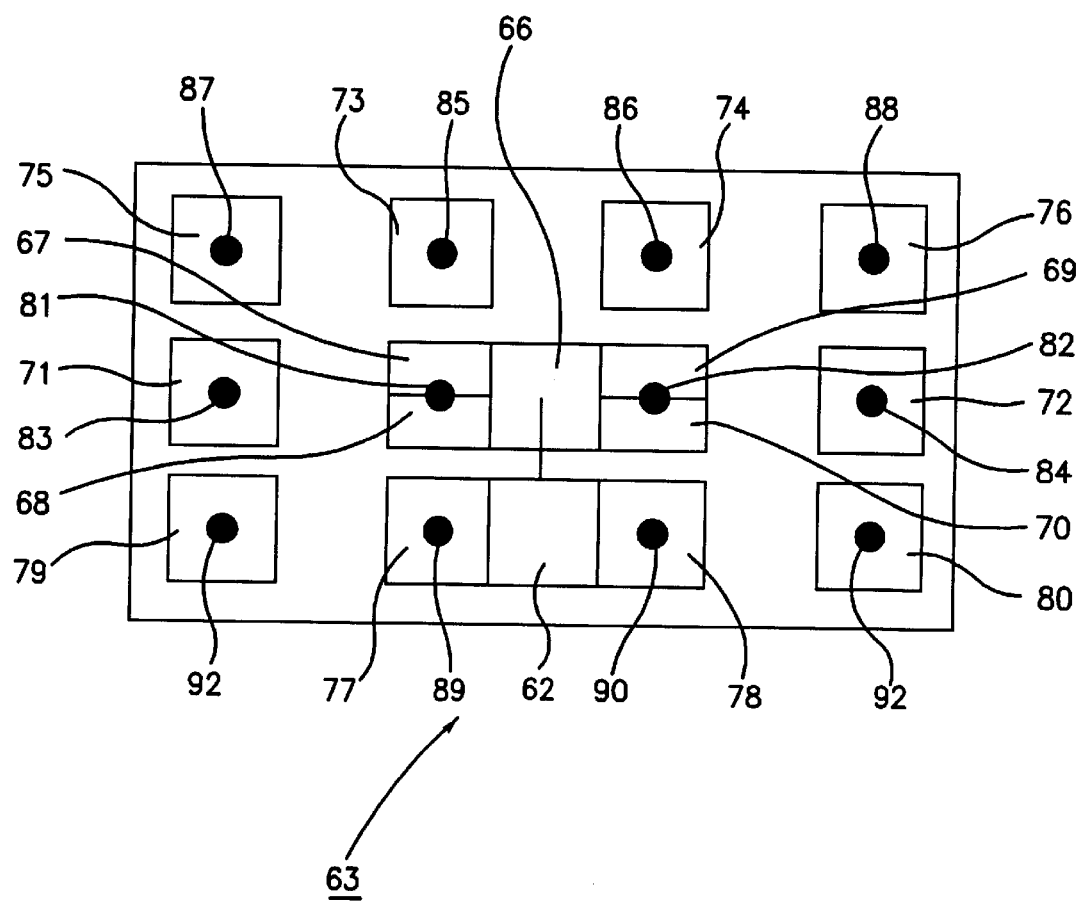
FIG. 20 is a plane view illustrative of an arrangement of beam spots and a pattern of photo-receiving portions of a photo-detector of the third novel optical head shown in FIG. 19.

FIG. 20 is a plane view illustrative of an arrangement of beam spots and a pattern of photo-receiving portions of a photo-detector of the third novel optical head shown in FIG. 19. The semiconductor laser 62 and a mirror 66 are provided over the photo-detector 63. A light emitted from the semiconductor laser 62 is reflected by the mirror 66 and the reflected light travels toward the optical disk 7. A beam spot 81 corresponds to a +1-ordr diffracted light transmitted from the first type region 16 of the polarization hologram optical device 65. The beam spot 81 is focused onto a boundary line bounding two divided photo-receiving regions 67 and 68, wherein the boundary line is parallel to the radial direction of the optical disk 7. A beam spot 82 corresponds to a +1-ordr diffracted light transmitted from the second type region 17 of the polarization hologram optical device 65. The beam spot 82 is focused onto a boundary line bounding two divided photo-receiving regions 69 and 70, wherein the boundary line is parallel to the radial direction of the optical disk 7. A beam spot 83 corresponds to a +1-ordr diffracted light transmitted from the third type region 18 of the polarization hologram optical device 65. The beam spot 83 is focused onto a non-divided single photo-receiving region 71. A beam spot 84 corresponds to a +1-ordr diffracted light transmitted from the fourth type region 19 of the polarization hologram optical device 65. The beam spot 84 is focused onto a non-divided single photo-receiving region 72. A beam spot 85 corresponds to a +1-ordr diffracted light transmitted from the first type region 16 of the polarization hologram optical device 65. The beam spot 85 is focused onto a non-divided single photo-receiving region 73. A beam spot 86 corresponds to a +1-ordr diffracted light transmitted from the second type region 17 of the polarization hologram optical device 65. The beam spot 86 is focused onto a non-divided single photo-receiving region 74. A beam spot 87 corresponds to a +1-ordr diffracted light transmitted from the third type region 18 of the polarization hologram optical device 65. The beam spot 87 is focused onto a non-divided single photo-receiving region 75. A beam spot 88 corresponds to a +1-ordr diffracted light transmitted from the fourth type region 19 of the polarization hologram optical device 65. The beam spot 88 is focused onto a non-divided single photo-receiving region 76. A beam spot 89 corresponds to a +1-ordr diffracted light transmitted from the first type region 16 of the polarization hologram optical device 65. The beam spot 89 is focused onto a non-divided single photo-receiving region 77. A beam spot 90 corresponds to a +1-ordr diffracted light transmitted from the second type region 17 of the polarization hologram optical device 65. The beam spot 90 is focused onto a non-divided single photo-receiving region 78. A beam spot 91 corresponds to a +1-ordr diffracted light transmitted from the third type region 18 of the polarization hologram optical device 65. The beam spot 91 is focused onto a non-divided single photo-receiving region 79. A beam spot 92 corresponds to a +1-ordr diffracted light transmitted from the fourth type region 19 of the polarization hologram optical device 65. The beam spot 92 is focused onto a non-divided single photo-receiving region 80.

Outputs from the photo-receiving regions 67–80 are represented as V67–V80 respectively. A focus error signal is obtained in a Foucault's method by an operation of (V67+V70)−(V68+V69). A track error signal from the focused beam spot 13 of the main beam is obtained in a push-pull method by an operation of (V71−V72). A reproducing signal from the focused beam spot 13 of the main beam is obtained by an operation of (V67+V68+V69+V70+V71+V72). A track error signal from the focused beam spots 14 and 15 of the sub-beam is obtained in a push-pull method by an operation of (V75+V79)−(V76+V80).

The above described methods of how to obtain the radial tilt can be applied to this second optical head. If the radial tilt of the optical disk is 0 degree, then the main beam and the sub-beam are correspondent to each other in the peak position of the focused beam spot. The focused sub-beam spot is larger in diameter than the focused main beam spot because the focused sub-beam spot is smaller in numerical number than the focused main beam spot.

If the radial tilt of the optical disk is +0.5 degrees, then the peak positions of the focused main beam spot and the focused sub-beam spot are displaced in a right direction in the drawing. Since the focused sub-beam spot is smaller in numerical number than the focused main beam spot, the amount of the displacement of the peak position of the focused sub-beam spot is smaller than the amount of the displacement of the peak position of the focused main beam spot. If the radial tilt appears on the optical disk, then the peak position of the focused sub-beam spot is left side of the peak positions of the focused main beam spot in the drawing. Side lobes appear on the right side of both the focused main beam spot and the focused sub-beam spot. Since the focused sub-beam spot is smaller in numerical number than the focused main beam spot, then the side lobe of the focused sub-beam spot is smaller in height than the side lobe of the focused main beam spot.

If the radial tilt of the optical disk is 0 degree, then the main beam and the sub-beam are correspondent to each other in the peak position of the focused beam spot. The focused sub-beam spot is larger in diameter than the focused main beam spot because the focused sub-beam spot is smaller in numerical number than the focused main beam spot.

If the radial tilt of the optical disk is −0.5 degrees, then the peak positions of the focused main beam spot and the focused sub-beam spot are displaced in a left direction in the drawing. Since the focused sub-beam spot is smaller in numerical number than the focused main beam spot, the amount of the displacement of the peak position of the focused sub-beam spot is smaller than the amount of the displacement of the peak position of the focused main beam spot. If the radial tilt appears on the optical disk, then the peak position of the focused sub-beam spot is right side of the peak positions of the focused main beam spot in the drawing. Side lobes appear on the left side of both the focused main beam spot and the focused sub-beam spot. Since the focused sub-beam spot is smaller in numerical number than the focused main beam spot, then the side lobe of the focused sub-beam spot is smaller in height than the side lobe of the focused main beam spot.

If the radial tile of the optical disk 7 is 0 degree, then the main beam and the sub-beam are correspondent in the peak position of the focused beam spot, for which reason the main beam and the sub-beam are correspondent in the phase of the track error signal. Since the focused sub-beam spot is larger in diameter than the focused main beam spot, the track error signal of the sub-beam is slightly smaller in amplitude than the track error signal of the main beam.

If he radial tile of the optical disk 7 is +0.5 degrees, then the peak positions of the focused sub-beam spot and the focused main beam spot are displaced in the right direction of the drawing, for which reason the phases of the track error signals of the main beam and the sub-beam are also shifted in the right direction in the drawing. Since the focused sub-beam spot is smaller in numerical number than the focused main beam spot, the amount of the displacement of the peak position of the focused sub-beam spot is smaller than the amount of the displacement of the peak position of the focused main beam spot, for which reason the amount of the phase shift of the sub-beam is smaller than the amount of the phase shift of the main beam. If the radial tilt appears on the optical disk, then the peak position of the focused sub-beam spot is left side of the peak positions of the focused main beam spot in the drawing, for which reason the phase of the track error signal of the sub-beam is left side of the phase of the track error signal of the main beam.

The track error signal of the main beam is used for the track servo. Firstly, it is considered that a track servo is applied to the land. If the radial tilt of the optical disk 7 is 0 degree, then as the track error signal of the main beam is 0, the track error signal of the sub-beam is also 0. If the radial tilt of the optical disk 7 is +0.5 degrees, then as the track error signal of the main beam is 0, the track error signal of the sub-beam takes a plus value. Secondly, it is considered that a track servo is applied to the groove. If the radial tilt of the optical disk 7 is 0 degree, then as the track error signal of the main beam is 0, the track error signal of the sub-beam is also 0. If the radial tilt of the optical disk 7 is +0.5 degrees, then as the track error signal of the main beam is 0, the track error signal of the sub-beam takes a minus value. Thirdly, it is considered that no track servo is applied as in the track access process. If the radial tilt of the optical disk 7 is 0 degree, then the main beam and the sub-beam are correspondent in the phase of the track error signal. If the radial tilt of the optical disk 7 is +0.5 degrees, then the phase of the track error signal of the sub-beam is positioned in the plus side of the phase of the track error signal of the main beam.

If the radial tile of the optical disk 7 is 0 degree, then the main beam and the sub-beam are correspondent in the peak position of the focused beam spot, for which reason the main beam and the sub-beam are correspondent in the phase of the track error signal. Since the focused sub-beam spot is larger in diameter than the focused main beam spot, the track error signal of the sub-beam is slightly smaller in amplitude than the track error signal of the main beam.

If he radial tile of the optical disk 7 is −0.5 degrees, then the peak positions of the focused sub-beam spot and the focused main beam spot are displaced in the left direction of the drawing, for which reason the phases of the track error signals of the main beam and the sub-beam are also shifted in the left direction in the drawing. Since the focused sub-beam spot is smaller in numerical number than the focused main beam spot, the amount of the displacement of the peak position of the focused sub-beam spot is smaller than the amount of the displacement of the peak position of the focused main beam spot, for which reason the amount of the phase shift of the sub-beam is smaller than the amount of the phase shift of the main beam. If the radial tilt appears on the optical disk, then the peak position of the focused sub-beam spot is right side of the peak positions of the focused main beam spot in the drawing, for which reason the phase of the track error signal of the sub-beam is right side of the phase of the track error signal of the main beam.

The track error signal of the main beam is used for the track servo. Firstly, it is considered that a track servo is applied to the land. If the radial tilt of the optical disk 7 is 0 degree, then as the track error signal of the main beam is 0, the track error signal of the sub-beam is also 0. If the radial tilt of the optical disk 7 is −0.5 degrees, then as the track error signal of the main beam is 0, the track error signal of the sub-beam takes a minus value. Secondly, it is considered that a track servo is applied to the groove. If the radial tilt of the optical disk 7 is 0 degree, then as the track error signal of the main beam is 0, the track error signal of the sub-beam is also 0. If the radial tilt of the optical disk 7 is −0.5 degrees, then as the track error signal of the main beam is 0, the track error signal of the sub-beam takes a plus value. Thirdly, it is considered that no track servo is applied as in the track access process. If the radial tilt of the optical disk 7 is 0 degree, then the main beam and the sub-beam are correspondent in the phase of the track error signal. If the radial tilt of the optical disk 7 is −0.5 degrees, then the phase of the track error signal of the sub-beam is positioned in the minus side of the phase of the track error signal of the main beam.

Firstly, it is considered that the track servo is applied to the land. If the radial tilts of the optical disk 7 are +0.5 degrees, 0 degree and −0.5 degrees respectively, then as the track error signal of the main beam is 0, the track error signals of the sub-beams take a plus value, 0 and a minus value respectively. This means that the track error signals of the sub-beams upon application of the track servo with the track error signal of the main beam is usable as the radial tilt signal. A signal obtained by subtracting the track error signal of the main beam from the track signal of the sub-beam is also usable as the radial tilt signal.

Secondly, it is considered that the track servo is applied to the groove. If the radial tilts of the optical disk 7 are +0.5 degrees, 0 degree and −0.5 degrees respectively, then as the track error signal of the main beam is 0, the track error signals of the sub-beams take a minus value, 0 and a plus value respectively. This means that the track error signals of the sub-beams upon application of the track servo with the track error signal of the main beam is usable as the radial tilt signal. A signal obtained by subtracting the track error signal of the main beam from the track signal of the sub-beam is also usable as the radial tilt signal.

Thirdly, it is considered that no track servo is applied. If the radial tilts of the optical disk 7 are +0.5 degrees, 0 degree and −0.5 degrees respectively, then as the track error signal of the main beam is 0, the differences in phase of the track error signal of the sub-beam from the track error signal of the main beam take a plus value, 0 and a minus value respectively. This means that a difference in phase of the track error signal of the sub-beam from the track error signal of the main beam is usable as the radial tilt signal.

If the track servo is applied to the land and if the radial tilts of the optical disk take a plus value, 0 and a minus value respectively, then the radial tilt signals take a plus value, 0 and a minus value respectively. If the track servo is applied to the groove and if the radial tilts of the optical disk take a plus value, 0 and a minus value respectively, then the radial tilt signals take a plus value, 0 and a minus value respectively. If the track servo is applied to both the land and the groove, then the increase in the absolute value of the radial tilt increases the absolute value of the radial tilt signal.

The sensitivity of the detection of the radial tilt is given by an absolute value of a gradient of the radial tilt signals in the vicinity of the origin in the drawing. The absolute value of the gradient of the radial tilt signals in the vicinity of the origin is about 0.4 per degree. This value is relatively high as the detection sensitivity. The radial tilt signal is obtained from the difference in phase of the track signal of the sub-beam from the track signal of the main beam, wherein the phase difference between the main beam rack signal and the sub-beam track signal is large, for which reason it is possible to realize a highly sensitive detection of the radial tilt.

Figure 21:
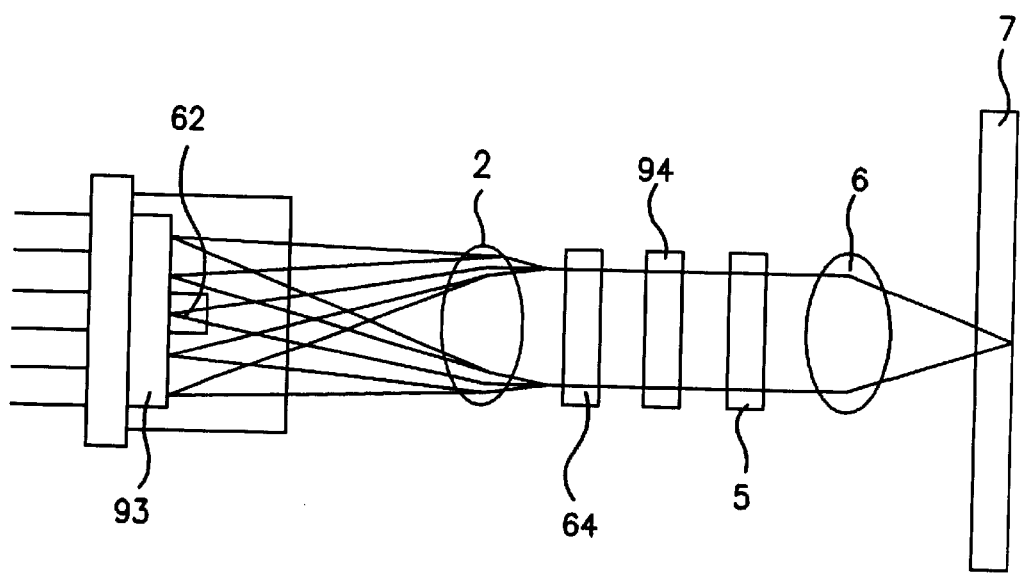
FIG. 21 is a schematic view illustrative of a fourth novel optical head which is capable of detecting the radial tilt of the optical recording medium in one preferred embodiment according to the present invention.

FIG. 21 is a schematic view illustrative of a fourth novel optical head which is capable of detecting the radial tilt of the optical recording medium in one preferred embodiment according to the present invention. The fourth novel optical head has a semiconductor laser 62, a collimator lens 2, a polarization diffraction optical device 64, a polarization hologram optical device 94, a quarter-wavelength plate 5, an objective lens 6, an optical disk 7, and a photo-detector 93. A laser beam is emitted from the semiconductor laser 1, and transmitted through the collimator lens 2 where the laser beam is collimated. The collimated laser beam is then transmitted through the polarization diffraction optical device 64, where the collimated laser beam is divided into three parts, for example, 0-order light, +1-order diffracted light, and −1-order diffracted light. The divided three lights as ordinary reach the polarization hologram optical device 94, wherein almost 100% of the divided three lights pass through the polarization hologram optical device 94 and then are transmitted through the quarter-wavelength plate 5, wherein the three lights are converted from the liner polarization to the circular polarization. The circular-polarized three lights are then transmitted through the objective lens 6, wherein the lights are focused onto the optical disk 7. The lights are then reflected from the optical disk 7 and further transmitted through the objective lens 6 to reach the quarter-wavelength plate 5, wherein the lights are converted from the circular polarization to the liner polarization but in an S-polarization direction perpendicular to the P-polarization direction. The S-polarized lights reach as extraordinary reach the polarization hologram optical device 94, wherein the most of incident lights are +1-order-diffracted. The lights are then incident into the polarization diffraction optical device 64 as the ordinary light and almost 100% of the lights pass through the polarization diffraction optical device 64. The three lights are then transmitted through the collimator lens 2 where the laser beam is collimated. The collimated lights reach the photo-detector 93. The photo-detector 93 is positioned at an intermediate point between focal points of the collimator lens 2 and the polarization hologram optical device 94.

The polarization diffraction optical device 64 has the same structure as the diffraction optical device 3 shown in FIG. 6. The polarization diffraction optical device 64 may have a grating which comprises two layers of a proton exchange region and a dielectric film over a lithium niobate substrate having a double refractivity. The depth of the proton exchange region and a thickness of the dielectric film are properly decided so that the phase difference between the line parts and the space parts of the grating may be defined for the ordinary light and the extraordinary light independently. For the extraordinary lights traveling toward the optical disk 7, the phase difference between the line parts and the space parts of the grating is, for example, set at $0.232\pi$, then about 87% of the 0-order non-diffracted light incident into the circular-shaped grating region 11 passes through the polarization diffraction optical device 64, about 5.1% of the +1-order diffracted light incident into the circular-shaped grating region 11 passes through the polarization diffraction optical device 64, and about 5.1% of the −1-order diffracted light incident into the circular-shaped grating region 11 passes through the polarization diffraction optical device 64. The lights incident into the outside region of the circular-shaped grating region 11 passes through the polarization diffraction optical device 64 at almost 100%. For the ordinary lights traveling toward the photo-detector 93, the phase difference between the line parts and the space parts of the grating is, for example, set at 0, then both the lights incident into the circular-shaped grating region 11 and the outside region of the circular-shaped grating region 11 pass through the polarization diffraction optical device 64 at almost 100%.

The arrangement of the beam spots on the optical disk 7 are the same as shown in FIG. 7. The structure of the polarization hologram optical device 94 is the same as shown in FIG. 8.

Figure 22:
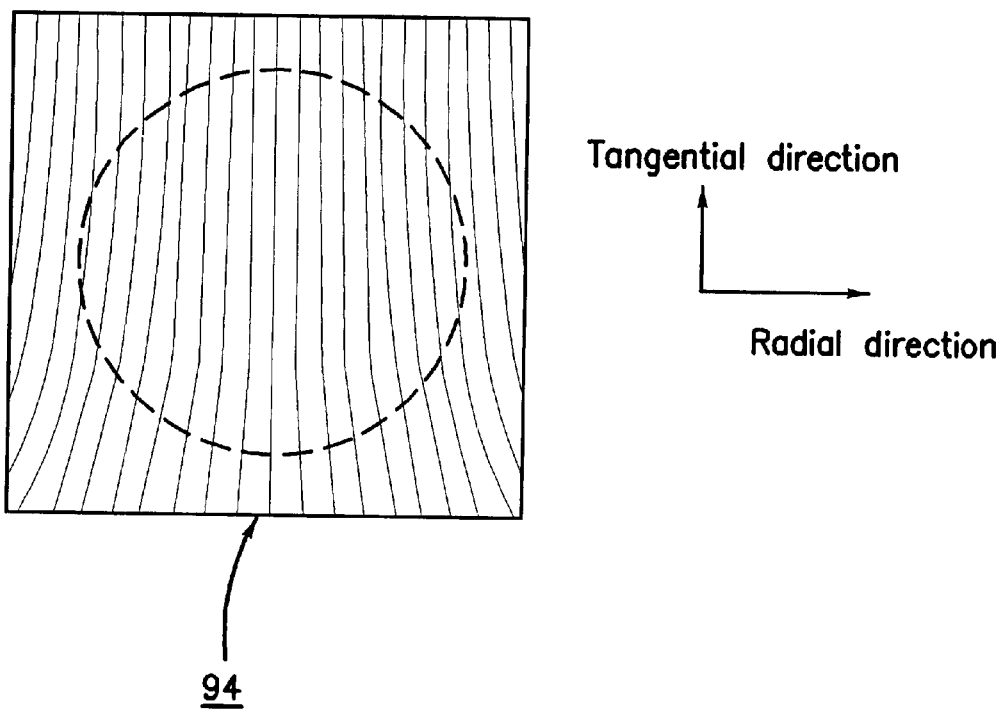
FIG. 22 is a plane view illustrative of the polarization hologram optical device of the fourth novel optical head shown in FIG. 21.

FIG. 22 is a plane view illustrative of the polarization hologram optical device of the fourth novel optical head shown in FIG. 21. The polarization hologram optical device 94 serves as a cylinder lens to the +1-order diffracted light and the −1-order diffracted light. A bus-bar of the +1-order diffracted light has an angle of +45 degrees to the radial direction of the optical disk 7. A bus-bar of the −1-order diffracted light has an angle of −45 degrees to the radial direction of the optical disk 7. The grating direction of the polarization hologram optical device 94 is almost parallel to the tangential direction. The grating pattern comprises plural hyperbolically curved line segments having a first asymptotic line parallel to the tangential direction and a second asymptotic line parallel to the radial direction. The polarization hologram optical device 94 may have a grating which comprises two layers of a proton exchange region and a dielectric film over a lithium niobate substrate having a double refractivity. The depth of the proton exchange region and a thickness of the dielectric film are properly decided so that the phase difference between the line parts and the space parts of the grating may be defined for the ordinary light and the extraordinary light independently. For the ordinary lights traveling toward the optical disk 7, the phase difference between the line parts and the space parts of the grating is, for example, set at 0, then almost 100% of the incident light passes through the polarization hologram optical device 94. For the extraordinary lights traveling toward the photo-detector 93, the phase difference between the line parts and the space parts of the grating is, for example, set at $\pi$, then about 40.5% of the incident light is diffracted as the +1-order diffraction and the −1-order diffraction.

Figure 23:
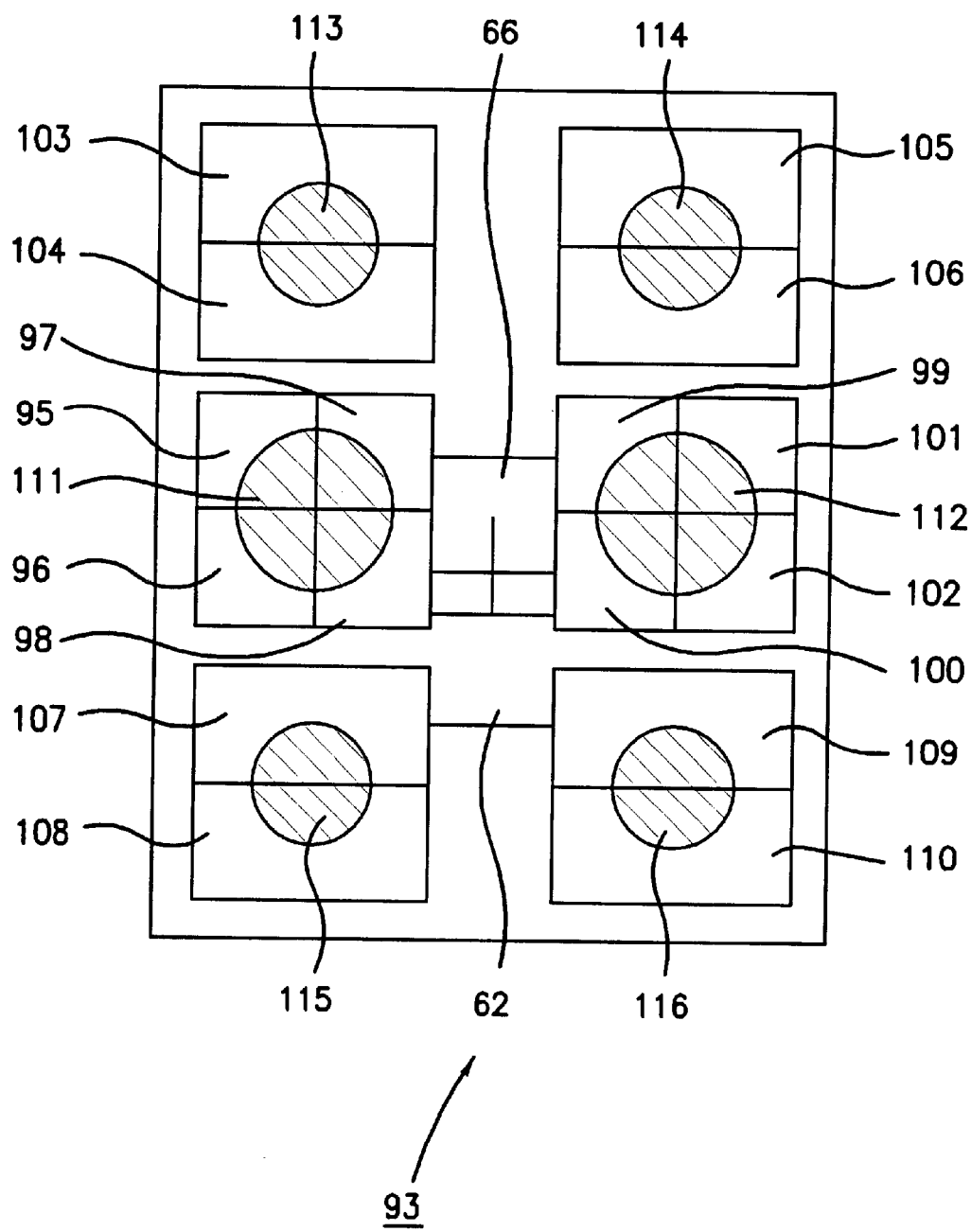
FIG. 23 is a plane view illustrative of the arrangement of the beam spots and the alignment of the photo-receiving regions of the photo-detector of the fourth novel optical head shown in FIG. 21.

FIG. 23 is a plane view illustrative of the arrangement of the beam spots and the alignment of the photo-receiving regions of the photo-detector of the fourth novel optical head shown in FIG. 21. The semiconductor laser 62 and the mirror 66 are provided over the photo-detector 93. A first beam spot 111 corresponds to the +1-order diffracted light transmitted through the polarization hologram optical device 94 in the non-diffracted light transmitted through the polarization diffraction optical device 64. The first beam spot 111 is received by four-divided photo-receiving areas 95, 96, 97 and 98 which are bounded by both a first dividing line crossing the optical axis and being parallel to the tangential line of the optical disk 7, and a second dividing line crossing the optical axis and being parallel to the radial direction. A second beam spot 112 corresponds to the −1-order diffracted light transmitted through the polarization hologram optical device 94 in the non-diffracted light transmitted through the polarization diffraction optical device 64. The second beam spot 112 is received by four-divided photo-receiving areas 99, 100, 101 and 102 which are bounded by both a first dividing line crossing the optical axis and being parallel to the tangential line of the optical disk 7, and a second dividing line crossing the optical axis and being parallel to the radial direction. A third beam spot 113 corresponds to the +1-order diffracted light transmitted through the polarization hologram optical device 94 in the +1-order diffracted light transmitted through the polarization diffraction optical device 64. The third beam spot 113 is received by two-divided photo-receiving areas 103 and 104 which are bounded by a single dividing line crossing the optical axis and being parallel to the radial direction. A fourth beam spot 114 corresponds to the −1-order diffracted light transmitted through the polarization hologram optical device 94 in the +1-order diffracted light transmitted through the polarization diffraction optical device 64. The fourth beam spot 114 is received by two-divided photo-receiving areas 105 and 106 which are bounded by a single dividing line crossing the optical axis and being parallel to the radial direction. A fifth beam spot 115 corresponds to the +1-order diffracted light transmitted through the polarization hologram optical device 94 in the −1-order diffracted light transmitted through the polarization diffraction optical device 64. The fifth beam spot 115 is received by two-divided photo-receiving areas 107 and 108 which are bounded by a single dividing line crossing the optical axis and being parallel to the radial direction. A sixth beam spot 116 corresponds to the −1-order diffracted light transmitted through the polarization hologram optical device 94 in the −1-order diffracted light transmitted through the polarization diffraction optical device 64. The sixth beam spot 116 is received by two-divided photo-receiving areas 109 and 116 which are bounded by a single dividing line crossing the optical axis and being parallel to the radial direction.

The alignment of the beam spots 13, 14 and 15 on the optical disk are parallel to the tangential direction. The alignment of the first, third, and fifth beam spots 111, 113 and 115 on the photo-detector 93 is parallel to the radial direction perpendicular to the tangential direction due to the functions of the collimator lens 2 and the polarization hologram optical device 94, and also the alignment of the second, fourth, and sixth beam spots 112, 114 and 116 on the photo-detector 93 is parallel to the radial direction perpendicular to the tangential direction due to the functions of the collimator lens 2 and the polarization hologram optical device 94. Since the bus-bars of the +1-order diffracted light and the −1-order diffracted light are perpendicular to each other, the intensity distributions of the first, third, and fifth beam spots 111, 113 and 115 are inverted in up-and-down and right-and-left directions from the intensity distributions of the second, fourth, and sixth beam spots 112, 114 and 116. The third, fourth, fifth and sixth beam spots 113, 114, 115 and 116 as the sub-beam spots are smaller in diameter than the first and second beam spots 111 and 112 as the main beam spot because the sub-beam spots are smaller in numerical number than the main beam spot.

Outputs from the photo-receiving areas 95 through 110 are represented by V95 to V110. Focus error signals are obtained by an astigmatism method, wherein an operation (V95+V98+V100+V101)−(V96+V97+V99+V102) is made. Track error signals are obtained from the focused main beam spot by a push-pull method, wherein an operation (V95+V97+V100+V102)−(V96+V98+V99+V101) is made. A reproducing signal from the beam spot 131 is obtained by an operation (V95+V96+V97+V98+V99+V100+V100+V102). Track error signals are obtained from the focused sub-beam spot by a push-pull method, wherein an operation (V103+V106+V107+V110)−(V104+V105+V108+V109) is made.

The above described methods of how to obtain the radial tilt can be applied to this novel optical head. If the radial tilt of the optical disk is 0 degree, then the main beam and the sub-beam are correspondent to each other in the peak position of the focused beam spot. The focused sub-beam spot is larger in diameter than the focused main beam spot because the focused sub-beam spot is smaller in numerical number than the focused main beam spot.

If the radial tilt of the optical disk is +0.5 degrees, then the peak positions of the focused main beam spot and the focused sub-beam spot are displaced in a right direction in the drawing. Since the focused sub-beam spot is smaller in numerical number than the focused main beam spot, the amount of the displacement of the peak position of the focused sub-beam spot is smaller than the amount of the displacement of the peak position of the focused main beam spot. If the radial tilt appears on the optical disk, then the peak position of the focused sub-beam spot is left side of the peak positions of the focused main beam spot in the drawing. Side lobes appear on the right side of both the focused main beam spot and the focused sub-beam spot. Since the focused sub-beam spot is smaller in numerical number than the focused main beam spot, then the side lobe of the focused sub-beam spot is smaller in height than the side lobe of the focused main beam spot.

If the radial tilt of the optical disk is 0 degree, then the main beam and the sub-beam are correspondent to each other in the peak position of the focused beam spot. The focused sub-beam spot is larger in diameter than the focused main beam spot because the focused sub-beam spot is smaller in numerical number than the focused main beam spot.

If the radial tilt of the optical disk is −0.5 degrees, then the peak positions of the focused main beam spot and the focused sub-beam spot are displaced in a left direction in the drawing. Since the focused sub-beam spot is smaller in numerical number than the focused main beam spot, the amount of the displacement of the peak position of the focused sub-beam spot is smaller than the amount of the displacement of the peak position of the focused main beam spot. If the radial tilt appears on the optical disk, then the peak position of the focused sub-beam spot is right side of the peak positions of the focused main beam spot in the drawing. Side lobes appear on the left side of both the focused main beam spot and the focused sub-beam spot. Since the focused sub-beam spot is smaller in numerical number than the focused main beam spot, then the side lobe of the focused sub-beam spot is smaller in height than the side lobe of the focused main beam spot.

If the radial tile of the optical disk 7 is 0 degree, then the main beam and the sub-beam are correspondent in the peak position of the focused beam spot, for which reason the main beam and the sub-beam are correspondent in the phase of the track error signal. Since the focused sub-beam spot is larger in diameter than the focused main beam spot, the track error signal of the sub-beam is slightly smaller in amplitude than the track error signal of the main beam.

If he radial tile of the optical disk 7 is +0.5 degrees, then the peak positions of the focused sub-beam spot and the focused main beam spot are displaced in the right direction of the drawing, for which reason the phases of the track error signals of the main beam and the sub-beam are also shifted in the right direction in the drawing. Since the focused sub-beam spot is smaller in numerical number than the focused main beam spot, the amount of the displacement of the peak position of the focused sub-beam spot is smaller than the amount of the displacement of the peak position of the focused main beam spot, for which reason the amount of the phase shift of the sub-beam is smaller than the amount of the phase shift of the main beam. If the radial tilt appears on the optical disk, then the peak position of the focused sub-beam spot is left side of the peak positions of the focused main beam spot in the drawing, for which reason the phase of the track error signal of the sub-beam is left side of the phase of the track error signal of the main beam.

The track error signal of the main beam is used for the track servo. Firstly, it is considered that a track servo is applied to the land. If the radial tilt of the optical disk 7 is 0 degree, then as the track error signal of the main beam is 0, the track error signal of the sub-beam is also 0. If the radial tilt of the optical disk 7 is +0.5 degrees, then as the track error signal of the main beam is 0, the track error signal of the sub-beam takes a plus value. Secondly, it is considered that a track servo is applied to the groove. If the radial tilt of the optical disk 7 is 0 degree, then as the track error signal of the main beam is 0, the track error signal of the sub-beam is also 0. If the radial tilt of the optical disk 7 is +0.5 degrees, then as the track error signal of the main beam is 0, the track error signal of the sub-beam takes a minus value. Thirdly, it is considered that no track servo is applied as in the track access process. If the radial tilt of the optical disk 7 is 0 degree, then the main beam and the sub-beam are correspondent in the phase of the track error signal. If the radial tilt of the optical disk 7 is +0.5 degrees, then the phase of the track error signal of the sub-beam is positioned in the plus side of the phase of the track error signal of the main beam.

If the radial tile of the optical disk 7 is 0 degree, then the main beam and the sub-beam are correspondent in the peak position of the focused beam spot, for which reason the main beam and the sub-beam are correspondent in the phase of the track error signal. Since the focused sub-beam spot is larger in diameter than the focused main beam spot, the track error signal of the sub-beam is slightly smaller in amplitude than the track error signal of the main beam.

If he radial tile of the optical disk 7 is −0.5 degrees, then the peak positions of the focused sub-beam spot and the focused main beam spot are displaced in the left direction of the drawing, for which reason the phases of the track error signals of the main beam and the sub-beam are also shifted in the left direction in the drawing. Since the focused sub-beam spot is smaller in numerical number than the focused main beam spot, the amount of the displacement of the peak position of the focused sub-beam spot is smaller than the amount of the displacement of the peak position of the focused main beam spot, for which reason the amount of the phase shift of the sub-beam is smaller than the amount of the phase shift of the main beam. If the radial tilt appears on the optical disk, then the peak position of the focused sub-beam spot is right side of the peak positions of the focused main beam spot in the drawing, for which reason the phase of the track error signal of the sub-beam is right side of the phase of the track error signal of the main beam.

The track error signal of the main beam is used for the track servo. Firstly, it is considered that a track servo is applied to the land. If the radial tilt of the optical disk 7 is 0 degree, then as the track error signal of the main beam is 0, the track error signal of the sub-beam is also 0. If the radial tilt of the optical disk 7 is −0.5 degrees, then as the track error signal of the main beam is 0, the track error signal of the sub-beam takes a minus value. Secondly, it is considered that a track servo is applied to the groove. If the radial tilt of the optical disk 7 is 0 degree, then as the track error signal of the main beam is 0, the track error signal of the sub-beam is also 0. If the radial tilt of the optical disk 7 is −0.5 degrees, then as the track error signal of the main beam is 0, the track error signal of the sub-beam takes a plus value. Thirdly, it is considered that no track servo is applied as in the track access process. If the radial tilt of the optical disk 7 is 0 degree, then the main beam and the sub-beam are correspondent in the phase of the track error signal. If the radial tilt of the optical disk 7 is −0.5 degrees, then the phase of the track error signal of the sub-beam is positioned in the minus side of the phase of the track error signal of the main beam.

Firstly, it is considered that the track servo is applied to the land. If the radial tilts of the optical disk 7 are +0.5 degrees, 0 degree and −0.5 degrees respectively, then as the track error signal of the main beam is 0, the track error signals of the sub-beams take a plus value, 0 and a minus value respectively. This means that the track error signals of the sub-beams upon application of the track servo with the track error signal of the main beam is usable as the radial tilt signal. A signal obtained by subtracting the track error signal of the main beam from the track signal of the sub-beam is also usable as the radial tilt signal.

Secondly, it is considered that the track servo is applied to the groove. If the radial tilts of the optical disk 7 are +0.5 degrees, 0 degree and −0.5 degrees respectively, then as the track error signal of the main beam is 0, the track error signals of the sub-beams take a minus value, 0 and a plus value respectively. This means that the track error signals of the sub-beams upon application of the track servo with the track error signal of the main beam is usable as the radial tilt signal. A signal obtained by subtracting the track error signal of the main beam from the track signal of the sub-beam is also usable as the radial tilt signal.

Thirdly, it is considered that no track servo is applied. If the radial tilts of the optical disk 7 are +0.5 degrees, 0 degree and −0.5 degrees respectively, then as the track error signal of the main beam is 0, the differences in phase of the track error signal of the sub-beam from the track error signal of the main beam take a plus value, 0 and a minus value respectively. This means that a difference in phase of the track error signal of the sub-beam from the track error signal of the main beam is usable as the radial tilt signal.

If the track servo is applied to the land and if the radial tilts of the optical disk take a plus value, 0 and a minus value respectively, then the radial tilt signals take a plus value, 0 and a minus value respectively. If the track servo is applied to the groove and if the radial tilts of the optical disk take a plus value, 0 and a minus value respectively, then the radial tilt signals take a plus value, 0 and a minus value respectively. If the track servo is applied to both the land and the groove, then the increase in the absolute value of the radial tilt increases the absolute value of the radial tilt signal.

The sensitivity of the detection of the radial tilt is given by an absolute value of a gradient of the radial tilt signals in the vicinity of the origin in the drawing. The absolute value of the gradient of the radial tilt signals in the vicinity of the origin is about 0.4 per degree. This value is relatively high as the detection sensitivity. The radial tilt signal is obtained from the difference in phase of the track signal of the sub-beam from the track signal of the main beam, wherein the phase difference between the main beam rack signal and the sub-beam track signal is large, for which reason it is possible to realize a highly sensitive detection of the radial tilt.

It is possible to modify the above described embodiments of the present invention.

Figure 24:
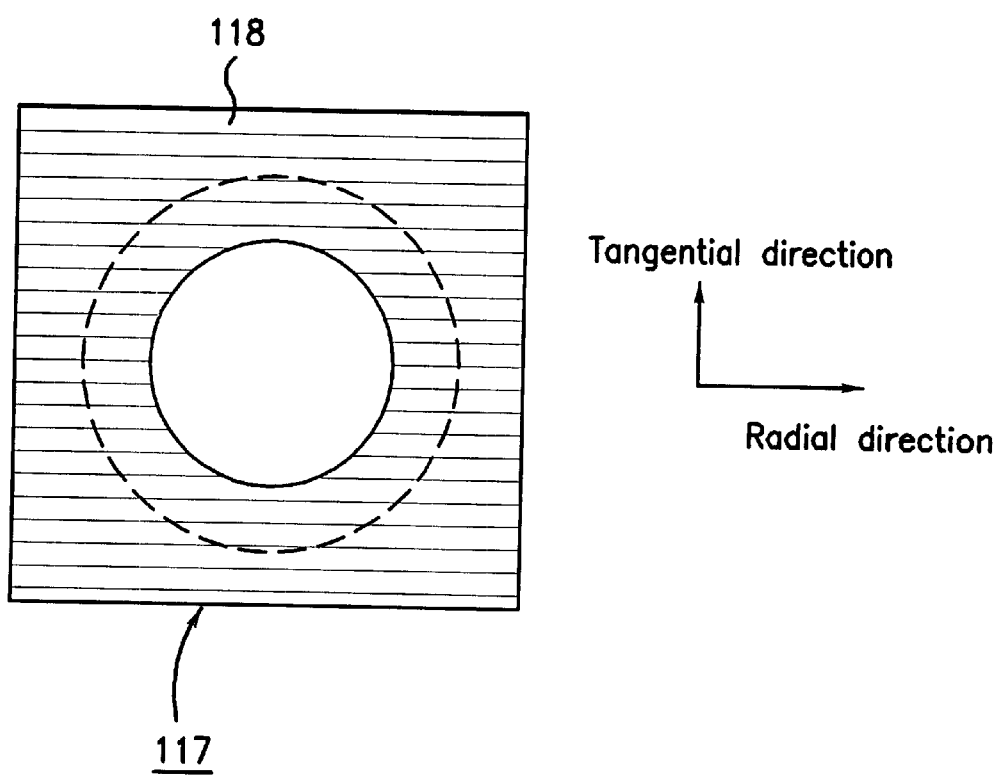
FIG. 24 is a plane view illustrative of a first alternative diffraction optical device.

It is possible to modify the above described first and second novel optical heads by replacing the diffraction optical device 3 with the following diffraction optical device. FIG. 24 is a plane view illustrative of a first alternative diffraction optical device. The first alternative diffraction optical device 117 has an outside region 118 of a circular-shaped region which is encompassed by a broken line which corresponds to a circumference of the objective lens 6, wherein a circular-shaped inside edge of the outside region 118 has a smaller diameter than the objective lens 6. A diffraction grating is selectively formed only in the outside region 118. The grating direction of the diffraction grating is parallel to the radial direction of the optical disk 7. The diffraction grating has a grating pattern which has a constant pitch alignment of plural straight line segments which are parallel to the radial direction perpendicular top the tangential direction. The diffraction grating comprises the alternating alignments of the line segments and space regions. If a difference in phase between the line segments and space regions of the diffraction grating is, for example, $0.232\pi$, then the light incident into the outside region 118 of the circular-shaped region is transmitted through the diffraction optical device 117 at almost 100%. About 87.3% of the light incident into the circular-shaped region is transmitted through the diffraction optical device 117, whilst about 5.1% of the incident light is diffracted to become the +1-order diffracted light and further about 5.1% of the incident light is diffracted to become the −1-order diffracted light. The main beam comprises not only the light incident into the circular-shaped region and the light incident into the outside region 118 of the circular-shaped region, for which reason the main beam is the ordinary beam having the numerical number depending upon the effective diameter of the objective lens 6. The sub-beam includes only the +1-order diffracted light and the −1-order diffracted light in the circular-shaped region, for which reason the sub-beam is the super-resolution beam having a shielding region depending upon a diameter of the outside region 118 and having a numerical number depending upon the effective diameter of the objective lens 6. As a result, the main beam and the sub-beam are different in intensity distribution from each other upon incidence into the objective lens 6. If the optical disk 7 has a radial tilt, then the diffraction optical device causes that the amount of the displacement of the focused sub-beam spot is larger than the amount of the displacement of the focused main beam spot.

Figure 25:
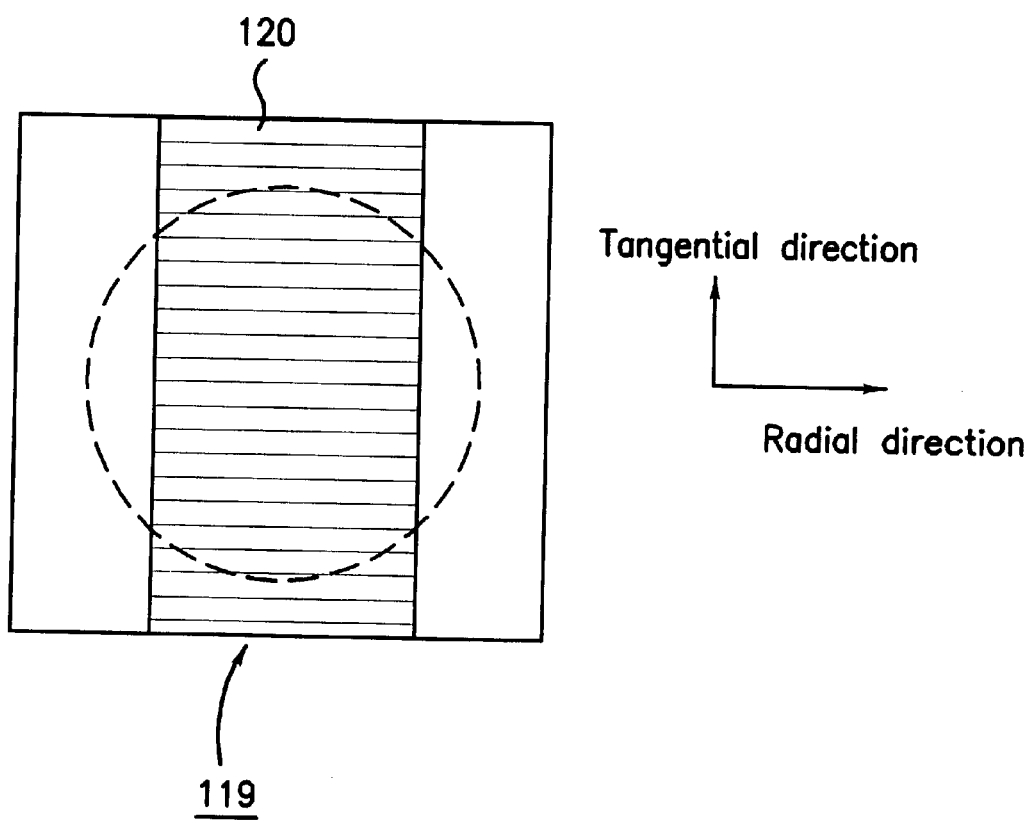
FIG. 25 is a plane view illustrative of a second alternative diffraction optical device.

It is also possible to modify the above described first and second novel optical heads by replacing the diffraction optical device 3 with the following diffraction optical device. FIG. 25 is a plane view illustrative of a second alternative diffraction optical device. The first alternative diffraction optical device 119 has a stripe-shaped region 120 having a longitudinal direction parallel to the tangential direction, wherein the stripe-shaped region 120 has a width in a radial direction, and the width is smaller than an effective diameter of the objective lens 6. A diffraction grating is selectively formed only in the stripe-shaped region 120. The grating direction of the diffraction grating is parallel to the radial direction of the optical disk 7. The diffraction grating has a grating pattern which has a constant pitch alignment of plural straight line segments which are parallel to the radial direction perpendicular top the tangential direction. The diffraction grating comprises the alternating alignments of the line segments and space regions. If a difference in phase between the line segments and space regions of the diffraction grating is, for example, 0.232π, then the light incident into the outside regions of the stripe-shaped region 120 is transmitted through the diffraction optical device 119 at almost 100%. About 87.3% of the light incident into the stripe-shaped region 120 is transmitted through the diffraction optical device 119, whilst about 5.1% of the incident light into the stripe-shaped region 120 is diffracted to become the +1-order diffracted light, and further about 5.1% of the incident light into the stripe-shaped region 120 is diffracted to become the −1-order diffracted light. The main beam comprises not only the light incident into the stripe-shaped region 120 and the outside region of the stripe-shaped region 120, for which reason the numerical number to the main beam depends upon the effective diameter of the objective lens 6. The sub-beam includes only the +1-order diffracted light and the −1-order diffracted light in the stripe-shaped region 120, for which reason the numerical number to the sub-beam in the radial direction depends upon the width of the stripe-shaped region 120 and the numerical number to the sub-beam in the tangential direction depends upon the effective diameter of the objective lens 6. As a result, the main beam and the sub-beam are different in intensity distribution from each other upon incidence into the objective lens 6. If the optical disk 7 has a radial tilt, then the diffraction optical device causes that the amount of the displacement of the focused sub-beam spot is smaller than the amount of the displacement of the focused main beam spot.

It is also possible to modify the third and fourth novel optical heads shown in FIGS. 19 and 21 by replacing the polarization diffraction optical device 64 by other alternative polarization diffraction optical devices having the same structures as shown in FIGS. 24 and 25.

In accordance with the above described first, second, third and fourth novel optical heads shown in FIGS. 5, 17, 19 and 21, both the +1-order diffracted light and the −1-order diffracted light are used as the sub-beams. It is also possible that only one of the +1-order diffracted light and the −1-order diffracted light is used as the sub-beam. If only one of the +1-order diffracted light and the −1-order diffracted light is used as the sub-beam, and if the alignment of the beam spots on the optical disk due to eccentric tilts toward the tangential direction, then an off-set appears on the radial tilt angle. If both the +1-order diffracted light and the −1-order diffracted light are used as the sub-beam, and if the alignment of the beam spots on the optical disk due to eccentric tilts toward the tangential direction, then no off-set appears on the radial tilt angle.

In accordance with the above described first, second, third and fourth novel optical heads shown in FIGS. 5, 17, 19 and 21, the emitted laser beam emitted from the semiconductor laser is divided into the plural lights as the main beam and the sub-beam. It is, however, possible that the main beam and the sub-beam are separately emitted from the semiconductor laser. In this case, a numerical aperture control device is provided on one of the optical paths of the main beam and the sub-beam between the semiconductor laser and the objective lens for causing that the main beam and the sub-beam incident into the objective lens are different in intensity distribution.

In accordance with the above descriptions, the first and second novel optical information recording/reproducing devices shown in FIGS. 15 and 16 are applied to the first novel optical head shown in FIG. 1. It is, however, possible to apply the first and second novel optical information recording/reproducing devices shown in FIGS. 15 and 16 to the second, third and fourth optical heads shown in FIGS. 17, 19 and 21.

In accordance with the above described present inventions, the main beam and the sub-beam are incident into the objective lens, wherein the main beam and the sub-beam are different in intensity distributions, so that the first track error signal is detected from the main beam and the second track error signal is also detected from the sub-beam, when the focused beam spot makes across the track in the radial direction of the optical storage medium.

If the optical storage medium has no radial tilt, then the main beam and the sub-beam have the correspondent peak position to each other of the focused beam spot in the radial direction of the optical storage medium. Accordingly, the main beam and the sub-beam have the correspondence to each other in phase of the track error signal. Namely, the first and second track error signals of the main beam and the sub-beam are corespondent to each other in its phase.

If the optical storage medium has a certain radial tilt, then the peak position of the focused beam spot in the radial direction of the optical storage medium is displaced due to the frame aberration which is caused by a substrate of the optical storage medium. Since the main beam and the sub-beam are different from each other in the intensity distribution upon incidence into the objective lens, then the main beam and the sub-beam are different from each other in the displacements of the peak position of the focused beam spot in the radial direction. Accordingly, the main beam and the sub-beam have different peak positions of the focused beam spot in the radial direction. Thus, the main beam and the sub-beam are different in phase of the track error signal. Namely, the first and second track error signals of the main beam and the sub-beam are different to each other in its phase. The radial tilt is obtained from the difference in phase of the first and second track error signals of the main beam and the sub-beam.

The optical information recording/reproducing device utilizes the optical head which is capable of detecting the radial tilt of the optical storage medium for making the compensation of the radial tilt of the optical storage medium in order to reduce the deterioration of the recording/reproducing characteristics.

Upon detection of the radial tilt, the main beam and the sub-beam are largely different in the phase of the track error signal with reference to the radial tilt. This makes it possible to realize a highly sensitive detection of the radial tilt. Upon the detection of the radial tilt, the radial tilt signal is obtained from the difference in phase of the first and second track error signals of the main beam and the sub-beam, for which reason it is possible to detect the radial tilt if the optical storage medium is a write-enable optical disk.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. An optical head comprising:
   a light source for emitting a light;
   a light transmitting system including an objective lens for focusing the emitted light onto an optical storage medium; and
   a photo-detector system for detecting a reflected light from the optical storage medium,
   wherein before the light is incident into the objective lens, the light has been divided into a main beam and at least a sub-beam which are different in intensity distribution from each other, and the photo-detector system detects first and second track error signals from the main beam and the sub-beam separately, and said photo-detector system further obtains a difference in phase between the first and second track error signals in order to detect a radial tilt of the optical storage medium on the basis of the difference in phase.

2. The optical head as claimed in claim 1, wherein the main beam and the sub-beam are focused on the same track of the optical storage medium.

3. The optical head as claimed in claim 1, wherein the light transmitting system further includes an optical diffraction device between the light source and the objective lens for dividing the light emitted from the light source into the main beam which comprises a transmitted light and the sub-beam which comprises at least one of +1-order diffracted light and −1-order diffracted light.

4. The optical head as claimed in claim 3, wherein the optical diffraction device may preferably be a polarization diffraction device.

5. The optical head as claimed in claim 3, wherein the optical diffraction device has a diffraction grating selectively existing only in an inside region of a circle having a smaller diameter than an effective diameter of the objective lens.

6. The optical head as claimed in claim 3, wherein the optical diffraction device has a diffraction grating selectively existing only in an outside region of a circle having a smaller diameter than an effective diameter of the objective lens.

7. The optical head as claimed in claim 3, wherein the optical diffraction device has a diffraction grating selectively existing only in a stripe-shape region having a smaller width than an effective diameter of the objective lens.

8. The optical head as claimed in claim 1, wherein the light source comprises a first light source emitting the main beam and a second light source emitting the at least sub-beam.

9. The optical head as claimed in claim 1, wherein the light transmitting system further includes a light intensity distribution varying device on at least one of optical paths of the main beam and the sub-beam between the light source and the objective lens.

10. The optical head as claimed in claim 1, wherein the second track error signal of the sub-beam is used as a radial tilt signal when a track servo is made with the first track error signal of the main beam.

11. The optical head as claimed in claim 1, wherein a signal obtained by subtracting the first track error signal of the main beam from the second track error signal of the sub-beam is used as a radial tilt signal when a track servo is made with the first track error signal of the main beam.

12. The optical head as claimed in claim 1, wherein a variation in phase of the second track error signal of the sub-beam from the first track error signal of the main beam is used as a radial tilt signal.

13. An optical information recording/reproducing device which includes: an optical head which comprises:
   a light source for emitting a light;
   a light transmitting system including an objective lens for focusing the emitted light onto an optical storage medium; and
   a photo-detector system for detecting a reflected light from the optical storage medium,
   wherein before the light is incident into the objective lens, the light has been divided into a main beam and at least a sub-beam which are different in intensity distribution from each other, and the photo-detector system detects first and second track error signals from the main beam and the sub-beam separately, and said photo-detector system further obtains a difference in phase between the first and second track error signals in order to detect a radial tilt of the optical storage medium on the basis of the difference in phase, and further a compensation of the radial tilt is made on the basis of the detected radial tilt.

14. The optical information recording/reproducing device as claimed in claim 13, wherein said compensation of the radial tilt is made by tilting the objective lens in a radial direction of the optical storage medium.

15. The optical information recording/reproducing device as claimed in claim 13, wherein the compensation of the radial tilt is made by tilting the optical head in a radial direction of the optical storage medium.

16. The optical information recording/reproducing device as claimed in claim 13, wherein the light transmitting system further includes a liquid crystal optical device applied with a control voltage on an optical path between the light source and the objective lens for making the compensation of the radial tilt.

17. The optical information recording/reproducing device as claimed in claim 13, wherein the second track error signal of the sub-beam is used as a radial tilt signal when a track servo is made with the first track error signal of the main beam, and a polarization of a circuit for making the compensation of the radial tilt is switched with lands and grooves of the optical storage medium.

18. The optical information recording/reproducing device as claimed in claim 13, wherein a signal obtained by subtracting the first track error signal of the main beam from the second track error signal of the sub-beam is used as a radial tilt signal when a track servo is made with the first track error signal of the main beam, and a polarization of a circuit for making the compensation of the radial tilt is switched with lands and grooves of the optical storage medium.

19. A method of detecting a radial tilt of an optical storage medium with reference to an optical head, wherein before a light is incident into an objective lens, the light has been divided into a main beam and at least a sub-beam which are different in intensity distribution from each other, and first and second track error signals detected from the main beam and the sub-beam separately, and a difference in phase between the first and second track error signals is obtained in order to detect a radial tilt of the optical storage medium on the basis of the difference in phase.

20. The method as claimed in claim 19, wherein the main beam and the sub-beam are focused on the same track of the optical storage medium.

21. The method as claimed in claim 19, wherein the light is diffracted for dividing the light into the main beam which comprises a transmitted light and the sub-beam which comprises at least one of +1-order diffracted light and −1-order diffracted light.

22. The optical head as claimed in claim 19, wherein the second track error signal of the sub-beam is used as a radial tilt signal when a track servo is made with the first track error signal of the main beam.

23. The optical head as claimed in claim 19, wherein a signal obtained by subtracting the first track error signal of the main beam from the second track error signal of the sub-beam is used as a radial tilt signal when a track servo is made with the first track error signal of the main beam.

24. The optical head as claimed in claim 19, wherein a variation in phase of the second track error signal of the sub-beam from the first track error signal of the main beam is used as a radial tilt signal.

25. A method of making a compensation to a radial tilt of an optical storage medium with reference to an optical head, wherein before a light is incident into an objective lens, the light has been divided into a main beam and at least a sub-beam which are different in intensity distribution from each other, and first and second track error signals are detected from the main beam and the sub-beam separately, and a difference in phase between the first and second track error signals is obtained in order to detect a radial tilt of the optical storage medium on the basis of the difference in phase, and further a compensation of the radial tilt is made on the basis of the detected radial tilt.

26. The method as claimed in claim 25, wherein the compensation of the radial tilt is made by tilting the objective lens in a radial direction of the optical storage medium.

27. The method as claimed in claim 25, wherein the compensation of the radial tilt is made by tilting the optical head in a radial direction of the optical storage medium.

28. The method as claimed in claim 25, wherein the light transmitting system further includes a liquid crystal optical device applied with a control voltage on an optical path between the light source and the objective lens for making the compensation of the radial tilt.

29. The method as claimed in claim 25, wherein the second track error signal of the sub-beam is used as a radial tilt signal when a track servo is made with the first track error signal of the main beam, and a polarization of a circuit for making the compensation of the radial tilt is switched with lands and grooves of the optical storage medium.

30. The method as claimed in claim 25, wherein a signal obtained by subtracting the first track error signal of the main beam from the second track error signal of the sub-beam is used as a radial tilt signal when a track servo is made with the first track error signal of the main beam, and a polarization of a circuit for making the compensation of the radial tilt is switched with lands and grooves of the optical storage medium.

* * * * *